United States Patent
Stillion et al.

(10) Patent No.: US 7,587,501 B2
(45) Date of Patent: Sep. 8, 2009

(54) SYSTEM, METHOD, AND COMPUTER STORAGE MEDIUM FOR ESTABLISHING SHARING OF RESOURCES WITH RECIPROCAL REQUESTS INCLUDED IN SHARING MESSAGES

(75) Inventors: Cameron D. Stillion, Redmond, WA (US); Amer G. Hamid, Woodland Hills, CA (US); Glenn L. Frankel, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 781 days.

(21) Appl. No.: 11/004,577

(22) Filed: Dec. 3, 2004

(65) Prior Publication Data

US 2006/0123008 A1 Jun. 8, 2006

(51) Int. Cl.
*G06F 15/16* (2006.01)
(52) U.S. Cl. .................. 709/229; 709/204; 709/206; 707/10
(58) Field of Classification Search .............. 709/204, 709/206, 229; 707/10
See application file for complete search history.

(56) References Cited

U.S. PATENT DOCUMENTS

| | | | | |
|---|---|---|---|---|
| 5,093,901 A | * | 3/1992 | Cree et al. ............... | 715/753 |
| 6,016,478 A | * | 1/2000 | Zhang et al. ............. | 705/9 |
| 2002/0010736 A1 | * | 1/2002 | Marques et al. .......... | 709/201 |
| 2002/0038316 A1 | * | 3/2002 | Onyon et al. ............. | 707/204 |
| 2002/0049610 A1 | * | 4/2002 | Gropper .................. | 705/1 |
| 2003/0009536 A1 | * | 1/2003 | Henderson et al. ....... | 709/219 |
| 2003/0014491 A1 | * | 1/2003 | Horvitz et al. ........... | 709/206 |
| 2003/0061087 A1 | * | 3/2003 | Srimuang ................ | 705/8 |
| 2003/0135565 A1 | * | 7/2003 | Estrada ................... | 709/206 |
| 2004/0044536 A1 | * | 3/2004 | Fitzpatrick et al. ....... | 705/1 |

* cited by examiner

*Primary Examiner*—Kenny S Lin
*Assistant Examiner*—Thomas J Dailey
(74) *Attorney, Agent, or Firm*—Merchant & Gould PC

(57) ABSTRACT

Electronic messages are used to request, accept and decline sharing resources. A PIM may be used to generate the sharing messages. A user can accept or decline a resource sharing request (e.g., to share access to a calendar, a contacts list and a tasks list) by selecting an option within the electronic message. In particular, a sharing message can be sent via e-mail which sets permissions for others to view a user's information. The sharing message may include a reciprocal sharing request. The sharing message can include both a statement that the initiator is sharing data as well as a request to allow the initiator to share the recipient's data. A sharing protocol is defined that relates to establishing and managing a sharing relationship between clients and sharing providers. A sharing infrastructure is includes a framework for sharing.

13 Claims, 20 Drawing Sheets

SYSTEM, METHOD, AND COMPUTER STORAGE MEDIUM FOR ESTABLISHING SHARING OF RESOURCES WITH RECIPROCAL REQUESTS INCLUDED IN SHARING MESSAGES

BACKGROUND OF THE INVENTION

Email has become an integral part of an individual's life both at business and at home. Through the use of email, individuals keep in touch, transact business and set up meetings. In some personal information manager (PIM) programs, a user can view their calendar and schedule meetings. A user selects a time on their calendar, creates an appointment, and selects people to invite to the meeting. Some programs even help to determine when people are available for the meeting that is being arranged. Once the details of the meeting are set, the user may email a meeting notice to each of the requested participants. Each of the requested participants receive an email in their inbox. When the user opens the meeting request, their PIM may determine if the requested meeting conflicts with an existing item in their calendar, and they can either accept, tentatively accept, or decline the meeting. The organizer can track who has accepted, declined, or counter-proposed times, simply by opening the meeting within the PIM program.

Sharing other resources with a user, however, is not as simple. While it is possible to share files, folders, and calendars with other users, initiating and setting up this sharing can be cumbersome and difficult.

SUMMARY OF THE INVENTION

Embodiments of the present invention are related to sharing resources.

According to one aspect of the invention electronic sharing messages are sent through email and are used to request, accept and decline resources. A PIM may be used to generate the sharing messages and may include many different types of functionality, including: but not limited to: e-mailing, calendaring, tasks, contacts management and the like.

According to another aspect of the invention a user can accept or decline a resource sharing request (e.g., to share access to a calendar, a contacts list and a tasks list) by selecting an option within the sharing message. In particular, a sharing message can be sent via e-mail which sets permissions for others to view a user's information.

According to yet another aspect of the invention, the sharing message may include a reciprocal sharing request. The sharing message can include both a statement that the initiator is sharing data as well as a request to allow the initiator to share the recipient's data.

According to still yet another aspect of the invention, a sharing protocol is defined that relates to establishing and managing a sharing relationship between clients and sharing providers.

According to another aspect of the invention, a sharing infrastructure is directed at providing a framework for sharing tasks, including: Relationship Establishment via: URL protocol, Sharing Message, Data Discovery, Periodic Replication & Synchronization, Schema Translation, and Conflict Resolution.

in accordance with aspects of the invention.

DETAILED DESCRIPTION OF THE PREFERRED EMBODIMENT

Generally, embodiments of the present invention are related to sharing resources. Electronic sharing messages are used to request, accept and decline resources. A user can accept or decline a resource sharing requests by selecting an option within a sharing message. In particular, a sharing message can be sent via e-mail which sets permissions for others to view a user's resource. The sharing message can also include a request for other people to set their permissions to allow the sender to share their data.

Figure 4:
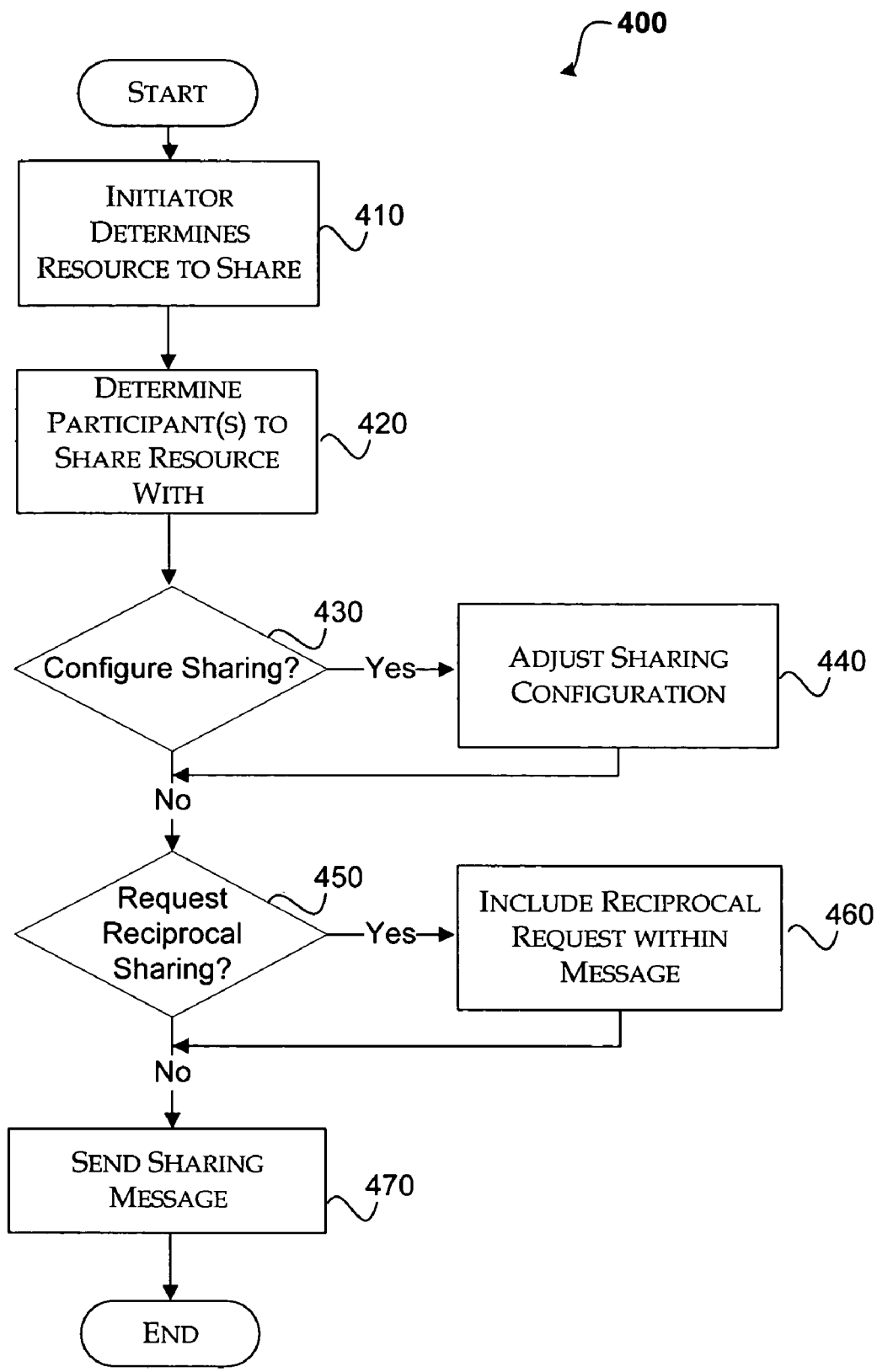
FIG. 4 illustrates a process for establishing resource sharing.

FIG. 4 illustrates a process for establishing resource sharing, in accordance with aspects of the invention.

After a start block the process moves to block 410, where a user (the "initiator") decides the resource that they would like to share with another user(s) (the "participant(s)"). According to one embodiment, the shared resource may be a calendar, a tasks list, and a contacts list. Other computer resources may also be shared. For example, a folder, a device, and the like may be shared.

At block 420, the initiator designates the participant(s) with whom they would like to share the resource. The participant may be any user that is coupled to the initiator through electronic means. For example, the user may be on the same network as the initiator, or the user may be located on a different network.

Moving to decision block 430, a determination is made as to whether the initiator desires to configure settings associated with the resource. According to one embodiment, the user may limit the information shared with the user. For example, the initiator may only want to share public meetings and events with the participants while keeping their private data from being shared.

When the initiator desires to adjust the sharing configuration, the process moves to block 440 where the initiator may configure the sharing settings.

When the initiator does not desire to adjust the sharing configuration, the process moves to decision block 450, where the initiator may decide whether to request reciprocal sharing with the participant. Reciprocal sharing allows not only the participant to view the initiator's resource but it also allows the initiator to view the participant's resource.

When the initiator requests reciprocal sharing, the process moves to block 460, where the reciprocal sharing request is added to the sharing message.

When the initiator does not desire to have reciprocal sharing the process moves to block 470.

At block 470, the sharing message is sent to the participants. When the initiator does not desire for the participants to reciprocally share, the participants are sent a sharing message stating that they have permission to view the resource. When the initiator desires to reciprocally share, the sharing request sent to the participants includes a message asking them to either accept or decline the reciprocal sharing request. If the participant accepts, an accept message is sent to the initiator with the ability for the initiator to view the shared resource. If the participants declines, the participant has the ability to send a note along with a decline message stating that the request has been rejected (See FIGS. 5-11 for exemplary sharing screens).

The process then moves to an end block and returns to processing other actions.

FIGS. 5-11 show exemplary sharing screens, in accordance with aspects of the invention. While these figures illustrate sharing a calendar, other sharing screens and UIs may be developed for sharing other resources, as discussed herein.

Figure 5:
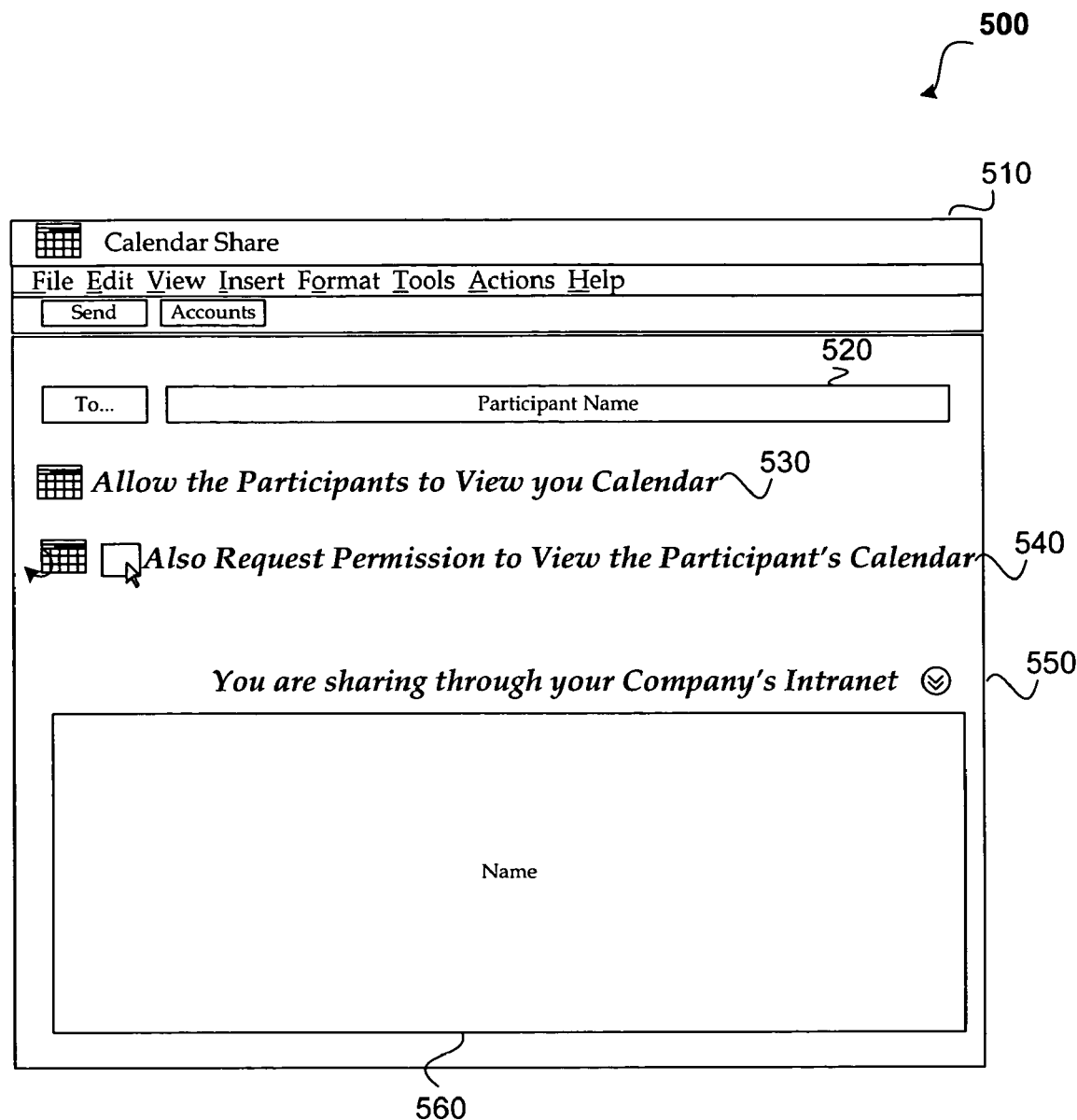
FIGS. 5-11 show exemplary sharing screens.

FIG. 5 shows an exemplary sharing message UI for configuring a sharing message, in accordance with aspects of the invention. Window 510 includes input text box 520 that is configured to receive the names of participants with whom the initiator would like to share the resource with. In this particular example, the initiator enters the names of the participants that they would like to share their calendar with. Message 530 informs the initiator that their calendar will be shared with the participants entered into text input box 520. Check box 540 allows the initiator to request permission to share the participant's calendar (a reciprocal sharing request). When check box 540 is selected, a message is sent to the participant requesting the participant to share their resource with the initiator. Selection 550 configures the sharing provider. According to one embodiment, the sharing may take place through an intranet, such as through Microsoft's Exchange® Server, through a shared service, such as Microsoft's Sharepoint® Service, or through a web portal. Input box 560 allows the initiator to input a personalized message to be delivered to the participants.

Figure 6:
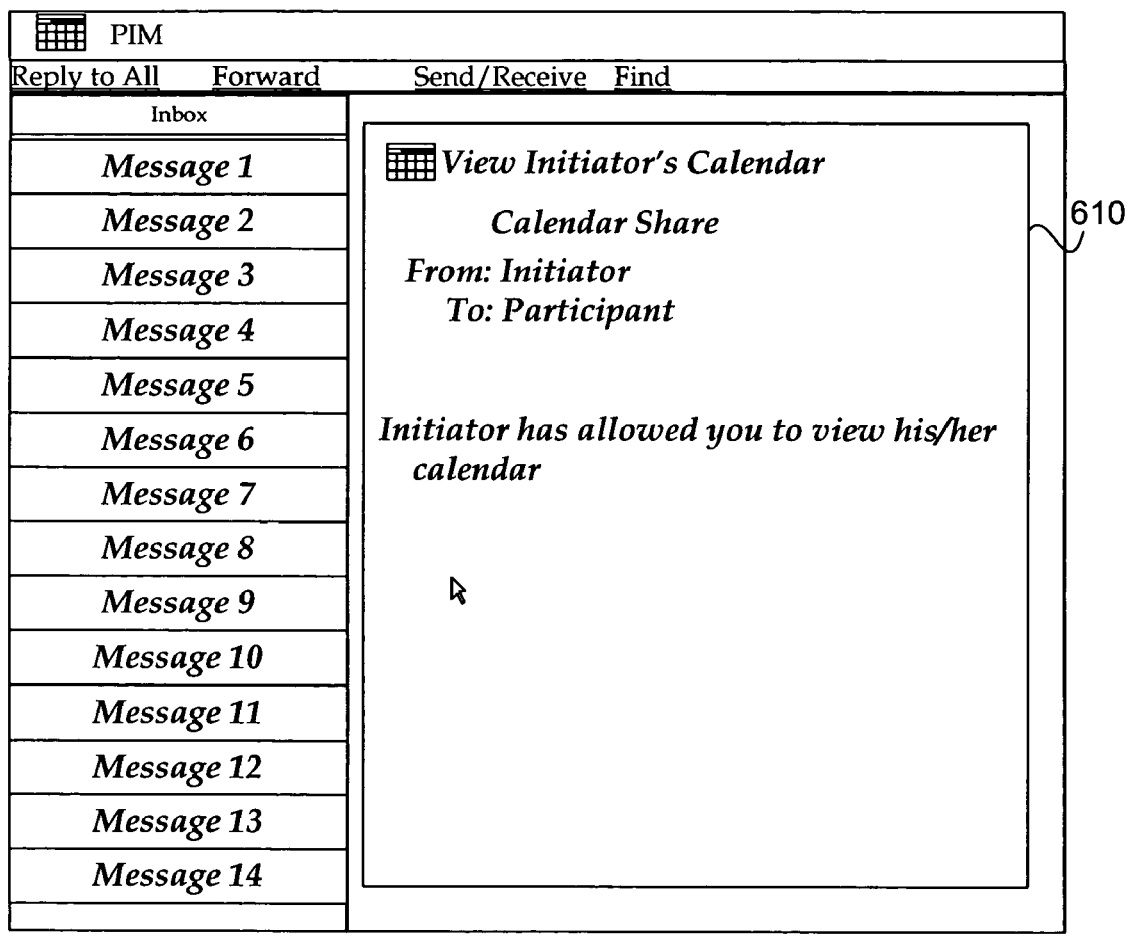

FIG. 6 illustrates a sharing message received by a participant, in accordance with aspects of the invention. Once a sharing message has been configured as illustrated in FIG. 5, the message is sent to the participants. Message 610 shows the participant that the initiator has shared their calendar with them.

Figure 7:
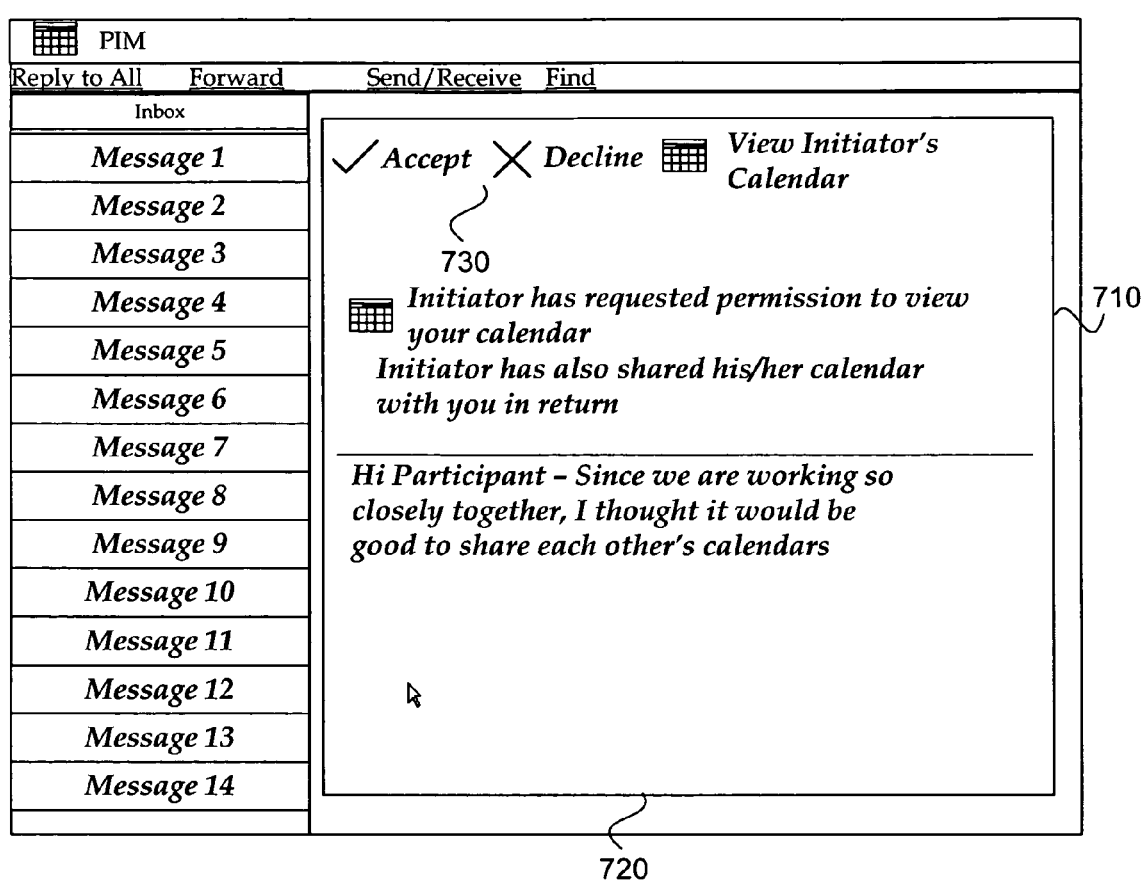

FIG. 7 illustrates a sharing message including a reciprocal sharing request received by a participant, in accordance with aspects of the invention. Message 710 shows the participant that the initiator has shared their calendar with them and has also requested that the participant share their calendar with the initiator. A personalized message (720) has also been included within message 710. Accept and Decline buttons 730 allow the participant to accept or decline the reciprocal sharing request. If the participant accepts the reciprocal sharing request, then the initiator will be able to view the participant's calendar and a sharing message is sent to the initiator (See FIG. 8 and related discussion). If the participant denies the reciprocal sharing request, then the initiator will not be able to view the participant's calendar.

Figure 8:
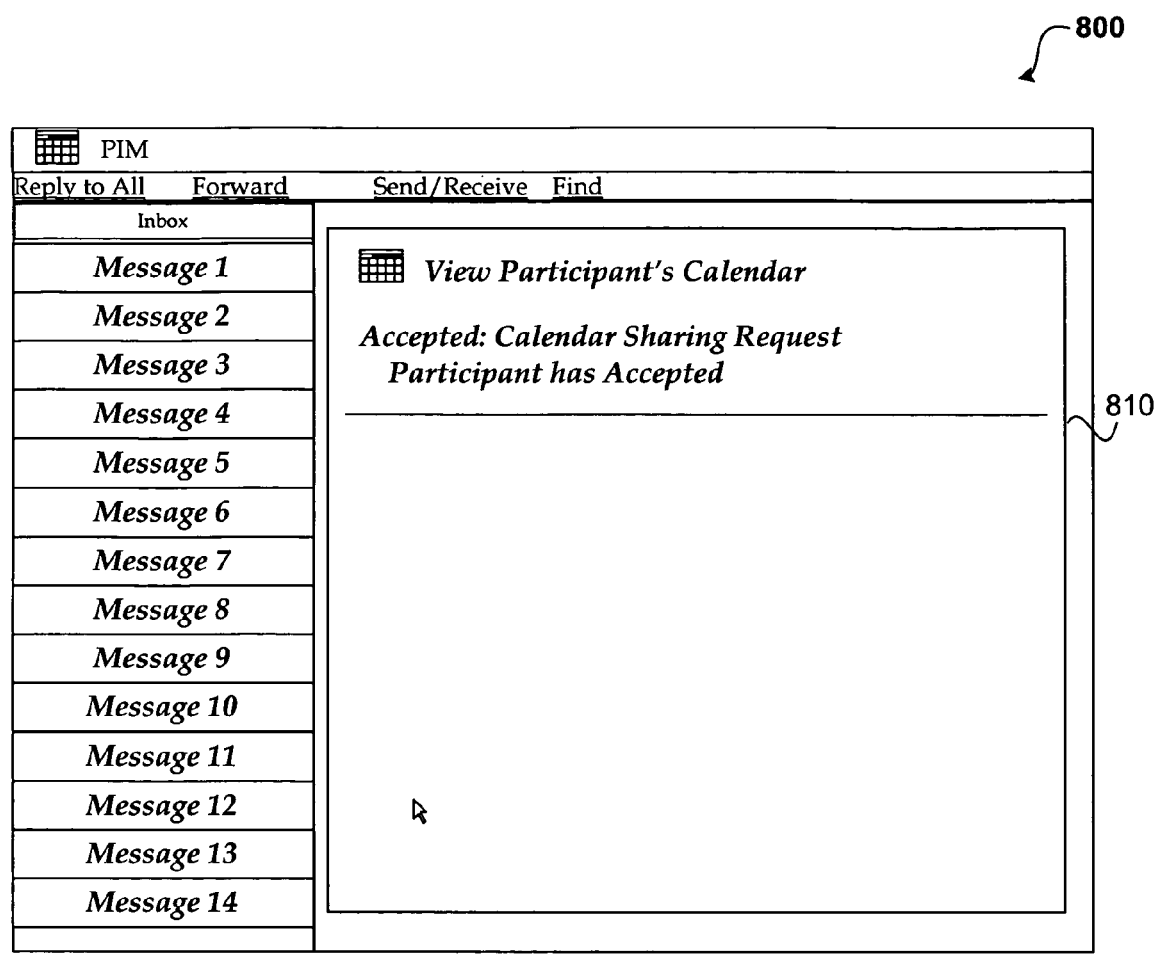

FIG. 8 shows a sharing message sent to the initiator in which a reciprocal sharing request was accepted by a participant, in accordance with aspects of the present invention. When a participant accepts a reciprocal sharing request, the initiator is sent a message (810) indicating that the participant has shared their calendar with the initiator in response to the initiator's reciprocal sharing request.

Figure 9:
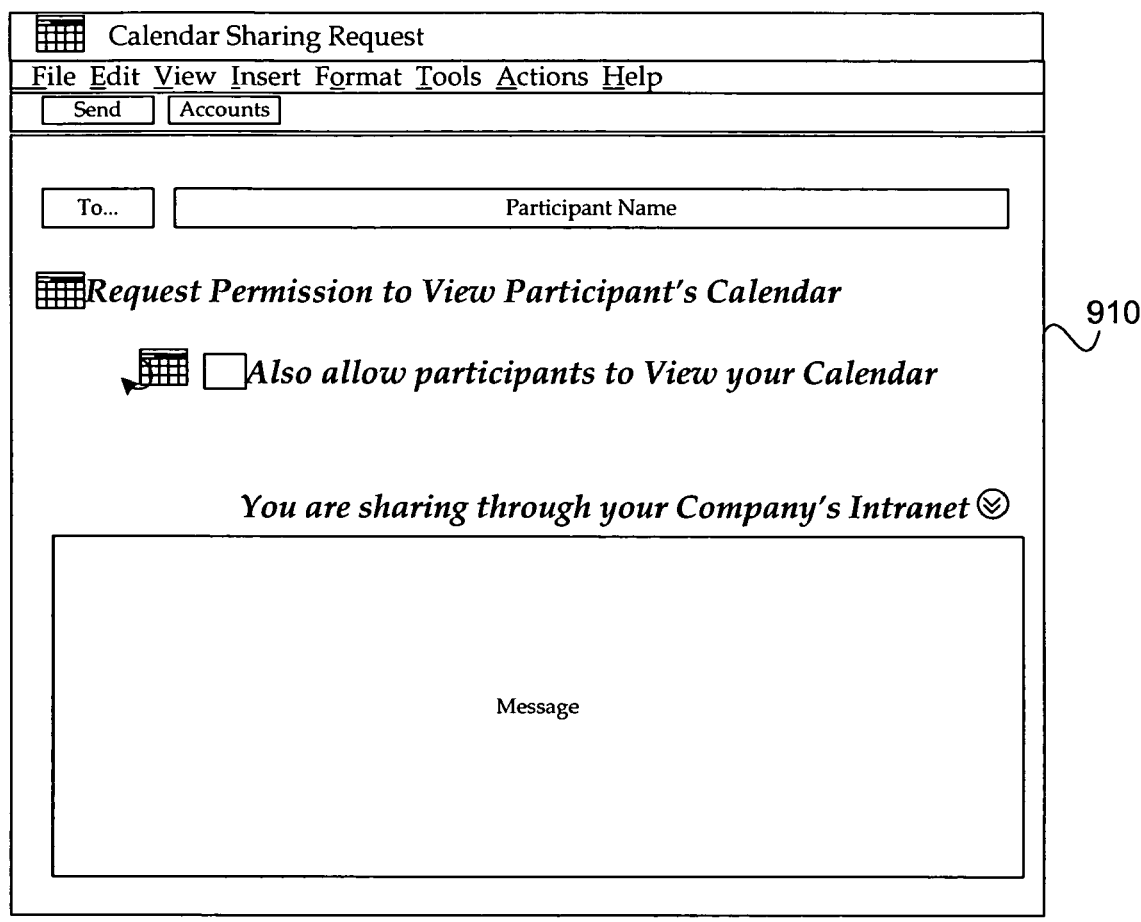

FIG. 9 illustrates an initiator requesting to view a participants resource, in accordance with aspects of the invention. Message 910 allows an initiator to request a participant to view their calendar without the initiator having to share their calendar with the participant. If desired, the initiator may select the check box if they would like the participant to be able to view their calendar.

Figure 10:
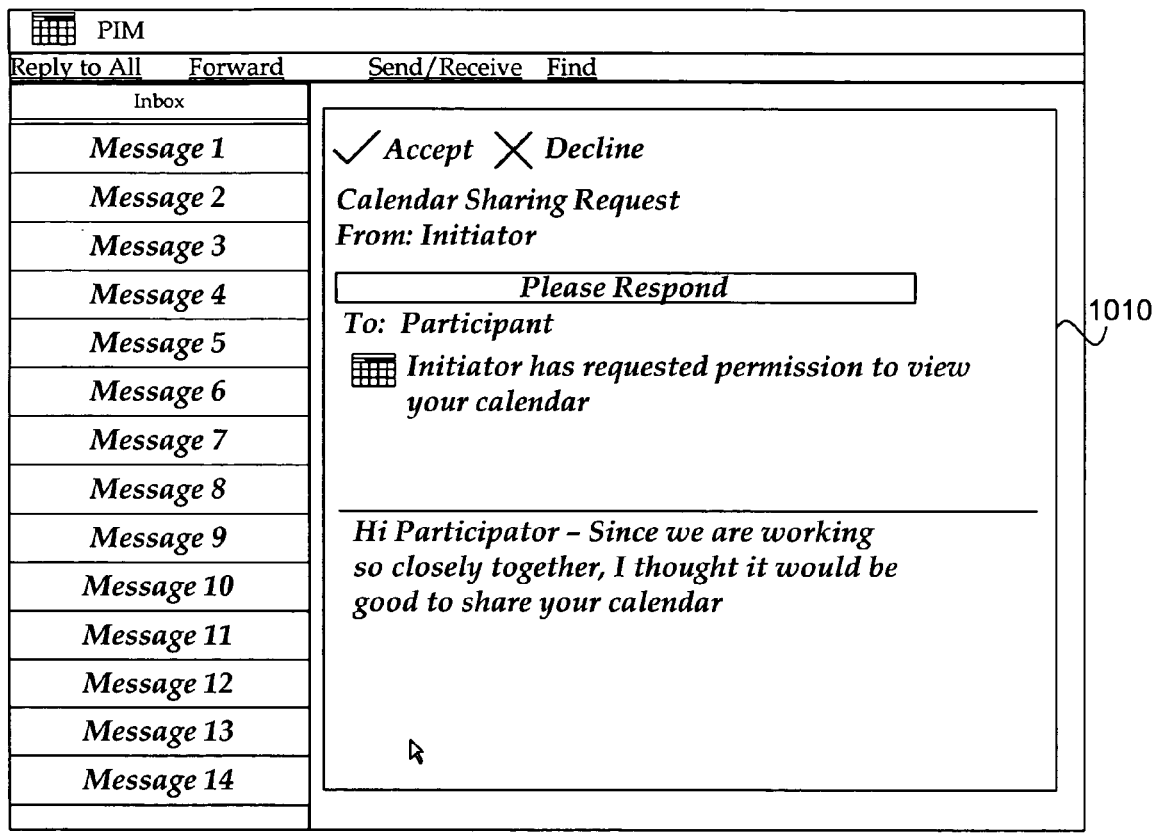

FIG. 10 shows a request to share a resource, in accordance with aspects of the present invention. As illustrated, message 1010 requests the participant to share their calendar with the initiator. If the participant selects to accept the request, then the initiator will be able to view the participants calendar. If the participant decides to decline the request, then no sharing will occur.

Figure 11:
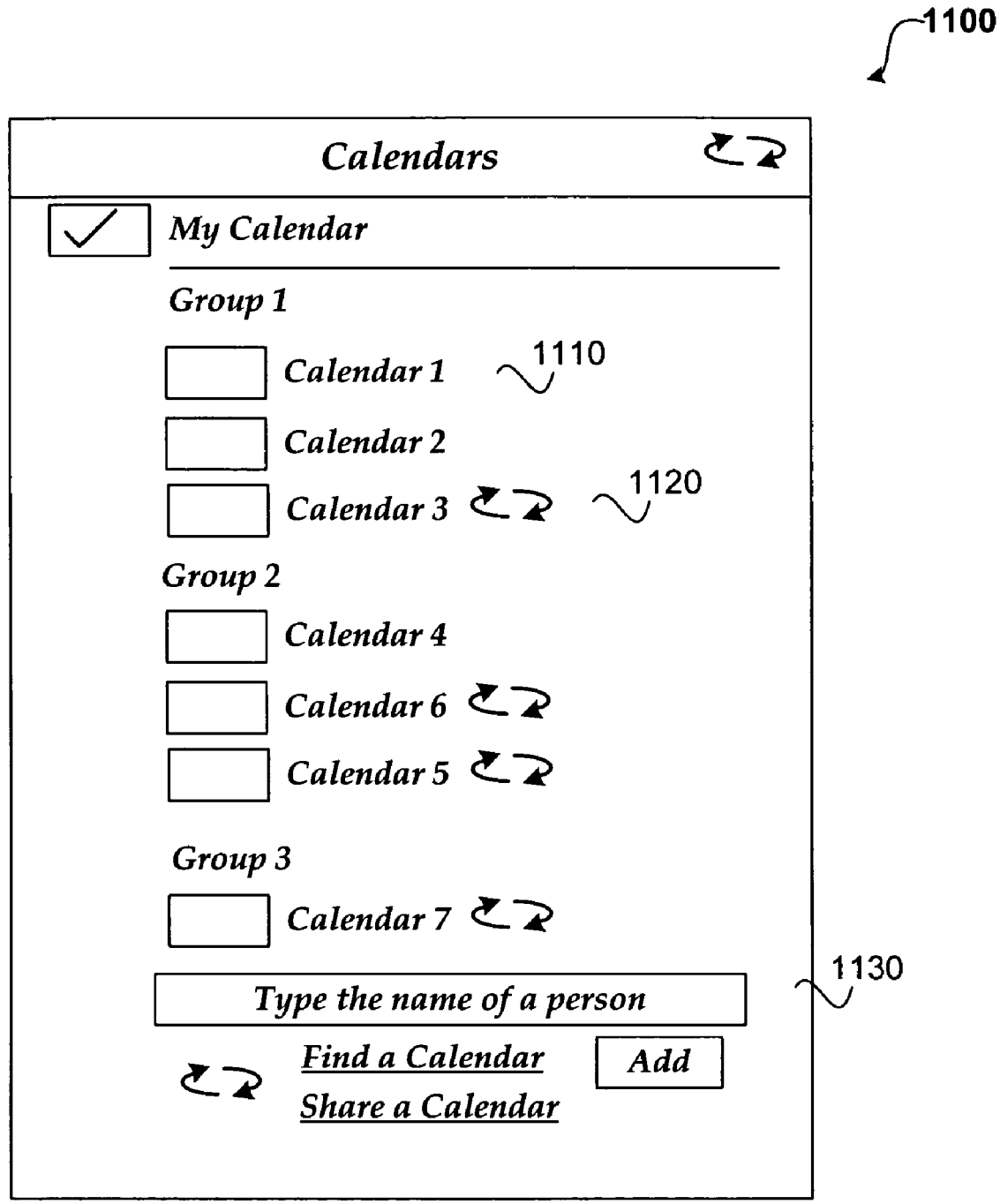

FIG. 11 illustrates a user interface for viewing and adjusting shared resources, in accordance with aspects of the present invention. In this example, the display shows shared calendars. As illustrated, the user has three groups of calendars that are shared. Icon 1120 is displayed when reciprocal sharing is occurring between the initiator and participant. When reciprocal sharing is not occurring, no icon is displayed next to the calendar name. The user may also find a calendar or share a calendar with someone by entering their name within input box 1130.

Sharing Protocol

The Sharing Protocol configures and manages sharing relationships between clients and Sharing Providers. Using this protocol, providers with different capabilities can be configured, enabling clients to upload/publish/send data and/or download/sync data via the provider's service.

The Sharing Protocol includes steps to send a sharing message which can be accepted or declined by the participant. Once the sharing relationships are established, they can be enumerated, modified, reconfigured, or revoked. Sharing relationships may also be established via URLs or supported file formats for more automatic configuration.

The sharing relationships are stored configurations of remote data that can be synchronized into a data store. According to one embodiment, the data store is associated with a PIM program. The initiator role, participator role, and share space role are used to embody the roles of users and systems involved in the sharing relationship.

The initiator role refers to the entity that shares the resource, sends the sharing message invitation, and starts the sharing process. The participator role refers to the entity or entities that receives the sharing message and accepts and affirms the sharing relationship. The participator may also reciprocate sharing to the initiator. The share space role refers to the entity that allows others to voluntarily participate (perhaps anonymously) in sharing. The share space is not an Initiator, but conceptually a proxy for the initiator. The share space may also serve as a remote storage location for Initiator and Participators to share. This space could also be a device or another user application.

Sharing Relationship Properties

Figure 17:
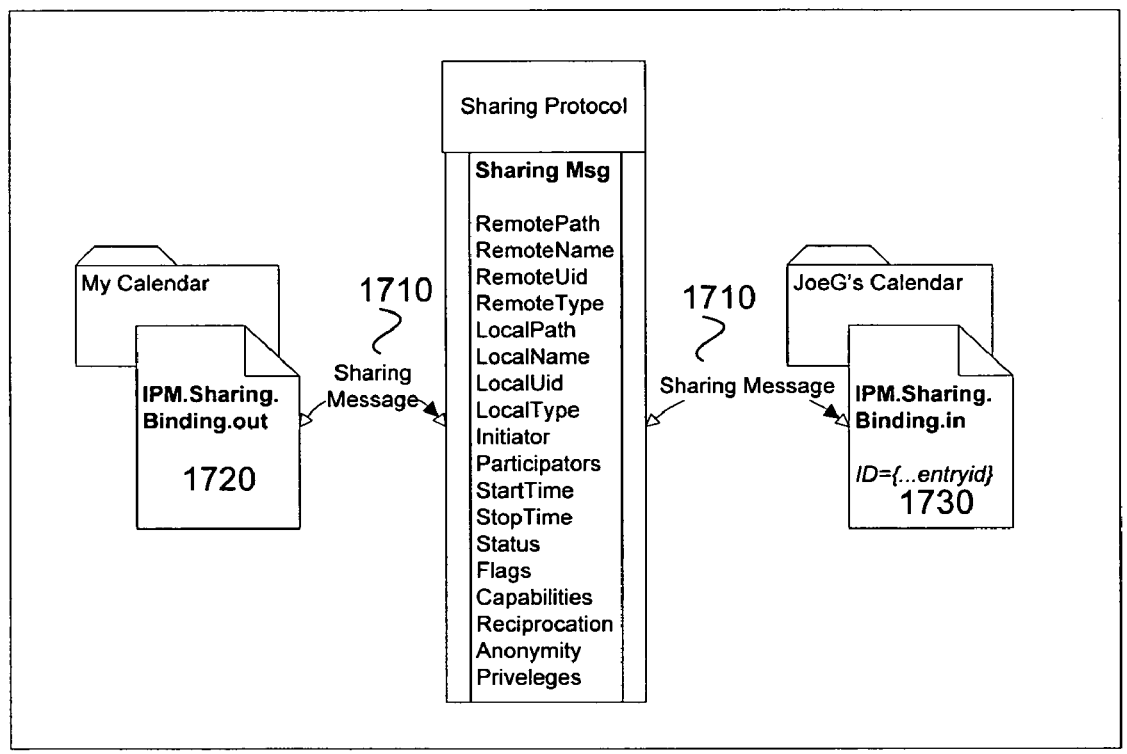
FIG. 17 illustrates bindings and configurations using the sharing message.

FIG. 17 illustrates bindings and configurations using the sharing message; in accordance with aspects of the invention.

Sharing Relationships are transported using a Sharing Message (1710). The Initiator provides some of the properties (attributes of the remote data, store, and permissions) and the Participator adds to the supplied properties (attributes of the local data and store) to establish the sharing relationship. The following table shows exemplary settings for the Sharing Relationship Context.

Initiator Sharing Properties:

| Prop | Type | Notes |
| --- | --- | --- |
| Instance ID | GUID | Unique ID for this sharing relationship instance |
| State | DWORD | State of this relationship (established, pending . . . ) |
| Provider Guid | GUID | Unique GUID identifying the sharing provider |
| Provider Name | Unicode | Display Name of Provider |
| Provider URL | Unicode | URL/path to download provider, or get more info. |
| Remote Path | Unicode | URL/path to remote data (share space) |
| Remote Name | Unicode | Friendly Name of remote data source |
| Remote ID | Unicode | Unique ID of remote data |
| Remote Type | Unicode | Content Type of remote data (e.g. "text/calendar") |
| Initiator Name | Unicode | Friendly name of the Initiator |
| Initiator SMTP | Unicode | smtp address of Initiator (user@domain.com) |
| Start Date | DateTime | Date when valid sharing starts |
| Stop Date | DateTime | Date when valid sharing stops |
| Filter | Restriction | Filter |
| Flags | DWORD | Flags for Access, Anonymity, and Reciprocation |
| ExtensionXml | Unicode | <structured provider-specific settings> |

These properties comprise part of the SharingRelationshipContext (SHRECX). According to one embodiment, the initiator stores these properties in an associated message of type "IPM.Sharing.Binding.out" (1720) on the source resource.

According to one embodiment, the Participator receives these properties in the Sharing Message. When the sharing or the resource takes place using a Share Space, then the Initiator publishes these settings along with the remote data, perhaps encoded in the URL, or in the payload of published data.

In the process of accepting and establishing the relationship, several other properties are added by the Participator. These may include:

Participator Sharing Properties:

| Prop | Type | Notes |
| --- | --- | --- |
| Local Path | Unicode | Path to locally replicated data |
| Local Name | Unicode | Friendly Name of locally replicated data |
| Local Uid | Unicode | Unique Id of locally replicated data |
| Local Type | Unicode | Local content type (e.g. "IPF.Appointment") |
| Sync Settings | SyncGroupID | Account-like sync settings (possibly a reference to the Sync Group, rather than the raw data) |
| Local Path | Unicode | Path to locally replicated data |

The Participator remembers these properties as the context of what is being shared. These are stamped on the resource (in an associated message "IPM.Sharing.Binding.in") (1730) that syncs with the remote data. Once accepted by the user and stamped onto a folder, this relationship is referred to as a binding.

Initiator-Participator Sharing

Figure 12:
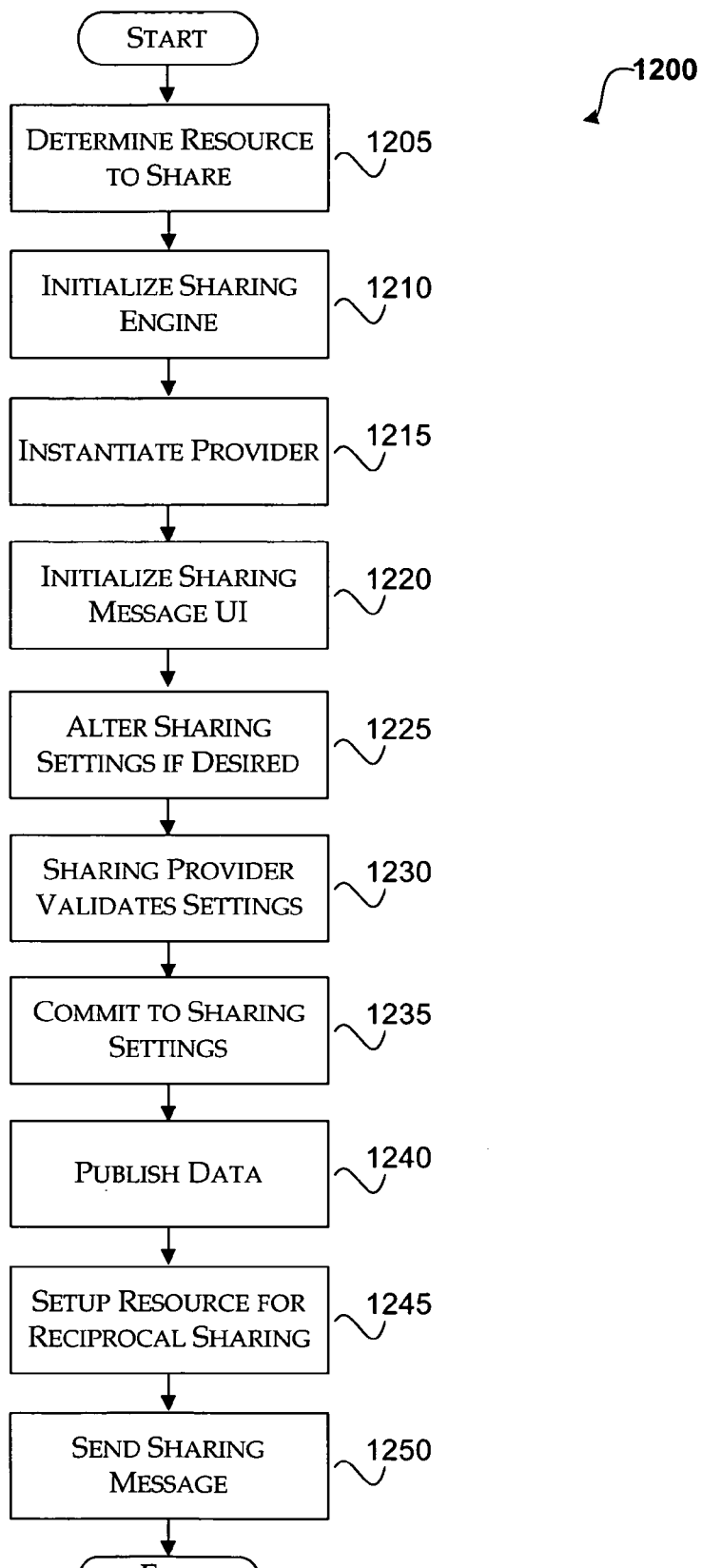
FIG. 12 shows a process for Initiator-Participator sharing.

FIG. 12 shows a process for Initiator-Participator sharing, in accordance with aspects of the present invention. Generally, Initiator-Participator Sharing takes place between users. The Initiator begins the process by creating a Sharing Message and addressing it to the potential participators. The Sharing Message carries the Initiator's sharing properties discussed above to the potential participator(s). The states for Initiator-Participator sharing begin with the Initiator as follows.

| # | State | Description |
| --- | --- | --- |
| 1205 | Initiator Selects Resource | Resource Select in context or prior to Sharing Message UI |
| 1210 | Sharing Engine Access | |
| 1215 | Provider Instantiation | ShEng instantiates specific provider (guess a default) |
| 1220 | Sharing Message UI | ShEng inits common UI, provider inits specific settings |
| 1225 | User Selects | User allowed to alter provider, recipients, and settings |
| 1230 | Provider Validation | Provider validates settings against resource & recipients |
| 1235 | User Commits | User submits message, committing the sharing settings |
| 1240 | Publish Data | Provider publishes to remote location (if necessary) |
| 1245 | Set Expectations | Setup resource or other holding places for back sharing |
| 1250 | Send Sharing Message | Sharing Message sent to reachable recipients |

During the composition of the sharing Message, the states shown in blocks 1225-135 may be visited several times. When the participants of the message change, provider validation occurs and feedback is given to the user. The sharing engine negotiates different sharing settings until sharing is successful with the participants.

The publishing of the data (block 1240) does not occur until the sharing message can be successfully sent to at least one of the participants. The sharing properties are also stamped onto the resource being shared so that the sharing relationship can be managed, altered, or removed.

In the case that not all participants were able to be shared with using the selected provider, the process may return to block 1215. At block 1215, the sharing engine chooses a more appropriate provider and repeats the process until all participants have seen shared with or the initiator cancels the process.

Figure 13:
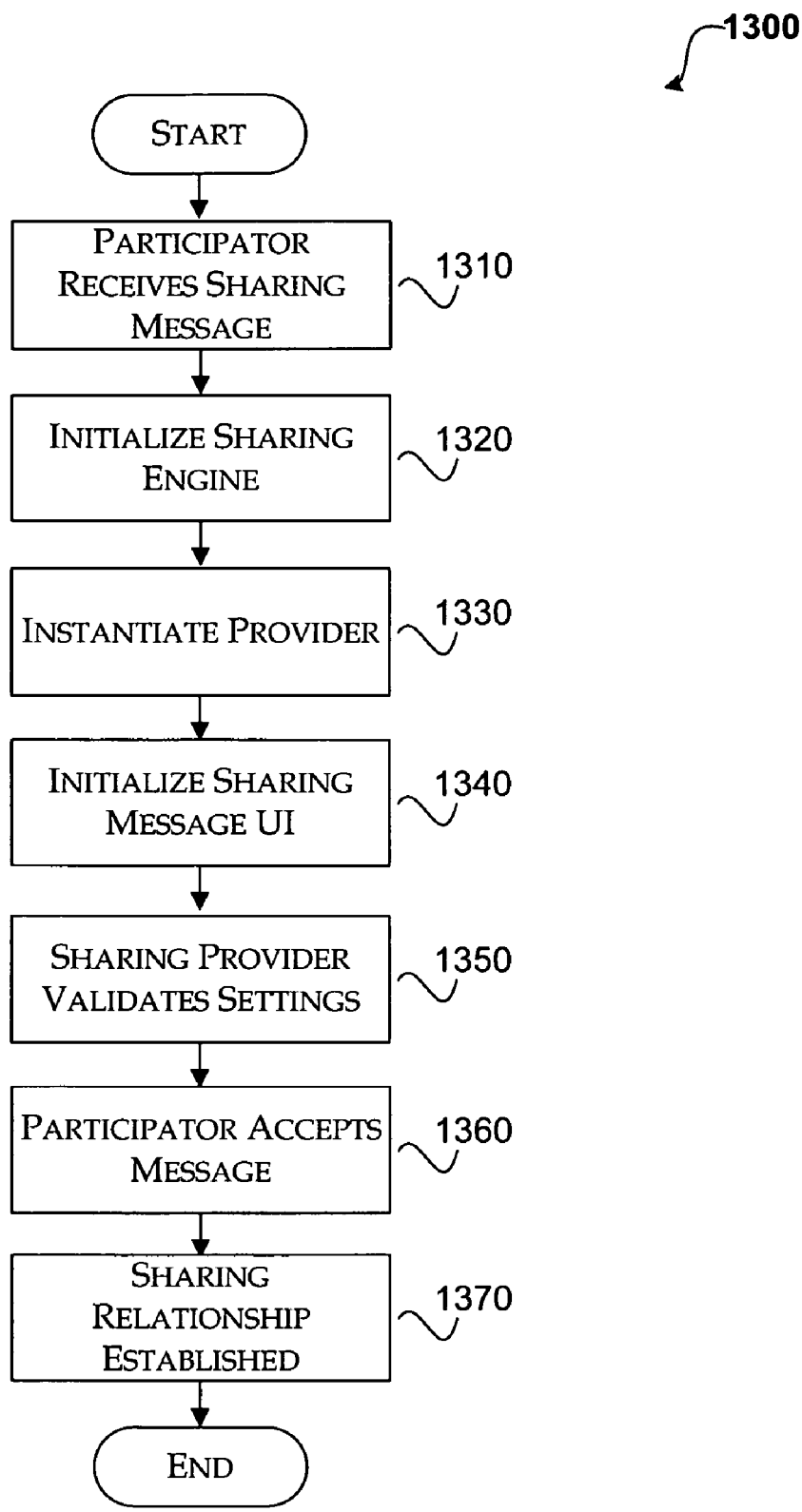
FIG. 13 illustrates the process once the sharing message is received by the participant.

FIG. 13 illustrates the process once the sharing message is received by the participant, in accordance with aspects of the invention. Once the sharing message is received by the Participator, the protocol continues as follows:

| # | State | Description |
| --- | --- | --- |
| 1310 | Participator Receives Sharing Message | Participator opens the Sharing Message |
| 1320 | Sharing Engine Access | Sharing Engine initialized with info from message |
| 1330 | Provider Instantiation | ShEng instantiates specific provider |
| 1340 | Sharing Accept UI | ShEng inits common UI, provider inits specific settings |
| 1350 | Provider Validation | Provider validates URL configuration |
| 1360 | User Commits | User accepts parcel, committing the sharing settings |
| 1370 | Relationship Established | Settings written to resource, data synced to client |

At block 1370, the sharing relationship properties are stamped on the folder where the synchronization is configured. That is, they are saved onto an associated message where they can be retrieved again when necessary.

Initiator-Space Sharing (Publishing)

Figure 14:
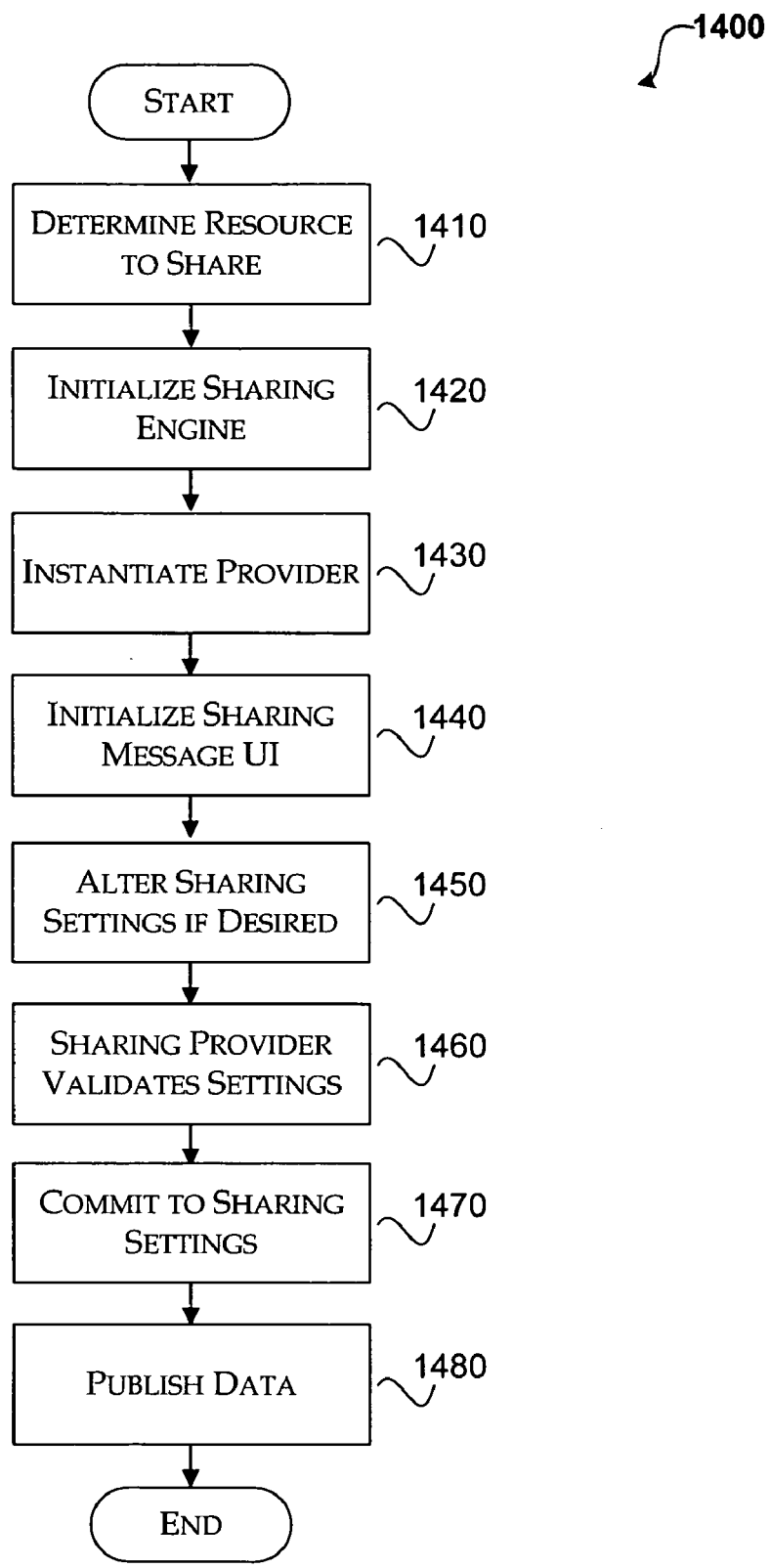
FIG. 14 shows a process for Initiator-Space sharing.

FIG. 14 shows a process for Initiator-Space sharing, in accordance with aspects of the invention. Publishing is simply the act of an Initiator pushing shared data out to a remote location or device (Share Space) without necessarily requesting any participants. In some cases participants will find the sharing space and voluntarily participate by interacting with that shared resource.

Publishing may also have intrinsic value beyond the subsequent Space-Participator sharing (which may or may not occur). For instance, publishing a calendar may generate an HTML-viewable calendar in addition to a payload iCal. Participators may then choose to simply view the calendar in web form rather than engage in a sharing relationship.

The process for Initiator-Space sharing is similar to the process for Initiator-Participator sharing as described above in conjunction with FIG. 12.

| # | State | Description |
|---|---|---|
| 1410 | Initiator Selects Resource | Resource Select in context or prior to Sharing Message UI |
| 1420 | Sharing Engine Access | Sharing Engine initialized with resource & context info |
| 1430 | Provider Instantiation | ShEng instantiates specific provider |
| 1440 | Sharing Message UI | ShEng inits common UI, provider inits specific settings |
| 1450 | User Selects | User allowed to alter provider, Space, and settings |
| 1460 | Provider Validation | Provider validates settings against resource & Space |
| 1470 | User Commits | User submits parcel, committing the sharing settings |
| 1480 | Publish Data | Provider publishes to Sharing Space (or Device) |

At block 1480, the configuration information is stamped on the resource or account so that it can be managed and reconfigured as appropriate.

Space-Participator Sharing

Figure 15:
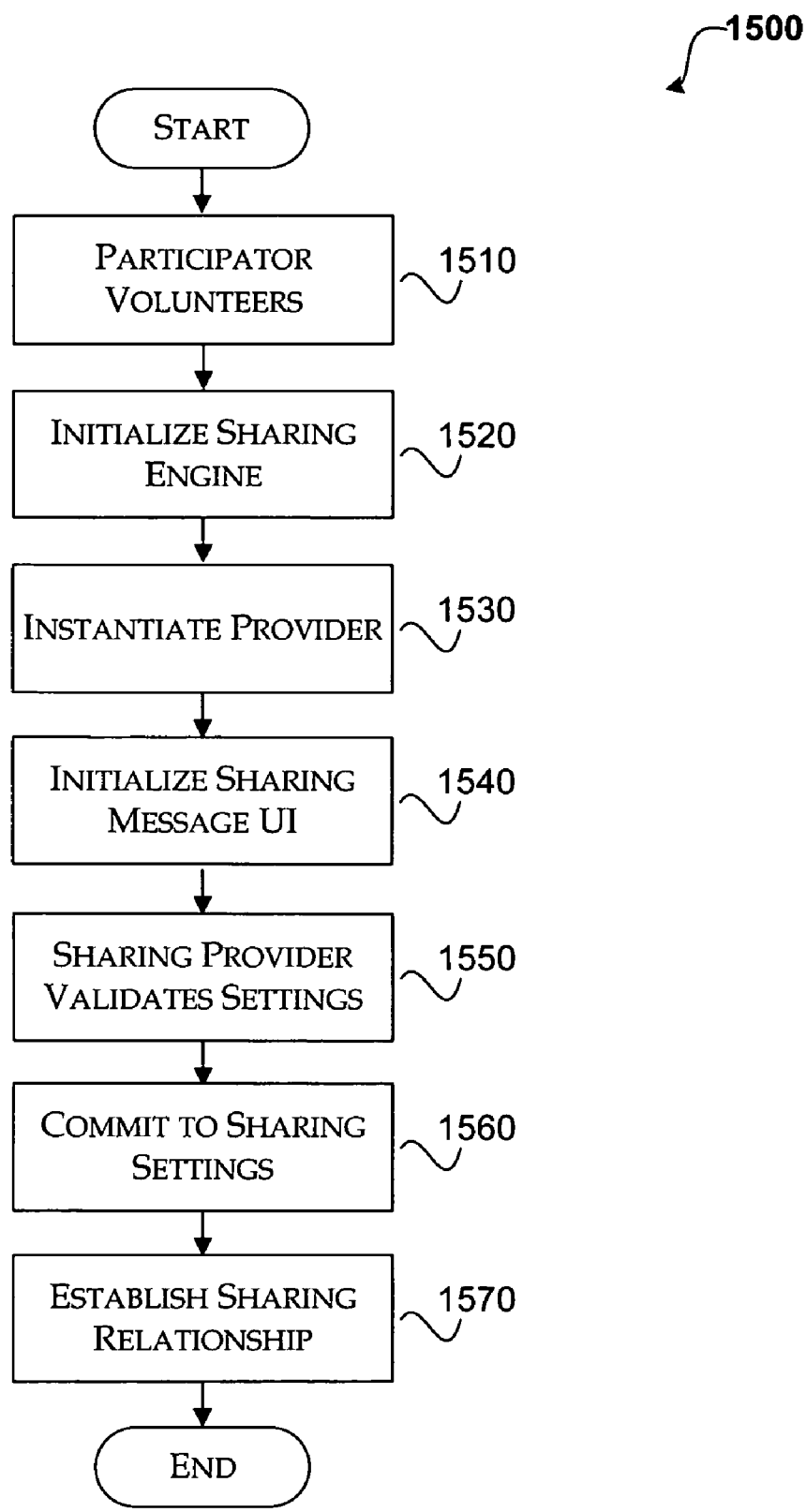
FIG. 15 shows a process for Space-Participator sharing.

FIG. 15 shows a process for Space-Participator sharing, in accordance with aspects of the invention. Space-participator sharing takes place when a participator locates a sharing space and voluntarily establishes a sharing relationship without any Initiator involvement. This typically happens when the user browses a website and clicks a URL hyperlink that is supported by the sharing engine or one of its providers.

The states for Space-Participator sharing are similar to the process described in conjunction with FIG. 13 above.

| # | State | Description |
|---|---|---|
| 1510 | Participator Volunteers | User navigates to Share Space and clicks sharing Link |
| 1520 | Sharing Engine Access | Sharing Engine initialized with URL context info |
| 1530 | Provider Instantiation | ShEng instantiates provider that handles URL |
| 1540 | Sharing Accept UI | ShEng inits common UI, provider inits specific settings |
| 1550 | Provider Validation | Provider validates URL configuration |
| 1560 | User Commits | User accepts parcel, committing the sharing settings |
| 1570 | Relationship Established | Settings written to resource, data synced to client |

Reciprocal Sharing

When an initiator specifies that the participator is encouraged or required to reciprocate, the protocol continues in the reverse direction, and the initiator becomes a co-participator. The first participator responds with a message similar to the one he received to begin the protocol, and sends it back to the initiator. The roles are then reversed.

Sharing Messages

The following are exemplary sharing message classes:

| Message Class | Description |
|---|---|
| IPM.Sharing.Parcel | Initiator's message to establish sharing with participator (data flows from Initiator to Participators) |
| IPM.Sharing.SASE | Initiator's message for participator to reciprocate sharing (data flows from Participators to Initiator) {SASE = self-addressed-stamped-envelope} |
| IPM.Sharing.Parcel.SASE | Sharing Parcel with an SASE. (data flows both ways) |
| IPM.Sharing.Response.* | Response sent by a Participator back to Initiator. Derivations of this class will follow the meeting request model roughly by appending hints to determine if it was accepted or rejected. |
| IPM.Sharing.Revoke | Revoke sharing relationship - discontinue syncing |
| IPM.Sharing.Update | When critical parts of the relationship change, this message is sent to participants so that they can update their client configurations. |

The IPM.Sharing.Parcel is a delivery of data sharing that does not encourage or require reciprocation. For example: user Alfa sends user Bravo a calendar via a Parcel. Bravo can now view the shared data.

The IPM.Sharing.SASE is a delivery without data, but includes a request to reciprocate data. For example: user Charlie asks user Delta to "please send their calendar info" via a SASE. Delta cannot access new data, but is requested to grant access to Charlie.

The IPM.Sharing.Parcel.SASE message is a combination delivery of actual data with a request to reciprocate. For example: user Echo sends their calendar to user Foxtrot and also requests that Foxtrot send a calendar back to Echo. In this case, Foxtrot has new data to view, but is also asked to reciprocate.

The IPM.Sharing.Response.* message is a method of communicating back to the initiators to track the establishment of sharing relationships.

The IPM.Sharing.Revoke message is a method of ceasing the sharing relationship and cleaning up any active links or references to the shared data, where appropriate.

The IPM.Sharing.Update message is sent to participators whenever the Initiator alters something critical about the sharing relationship—such as: source location, permissions, etc.

URL Protocol Support

Sharing providers may support URL protocols for the establishment of sharing relationships. These URLs can be placed in web pages or HTML messages for delivery or discovery by participators. These HTML pages constitute sharing spaces. Current examples of such sharing URL protocols, are the webcal: and stssync: protocols.

The PIM, such as an email client, is registered as a handler for protocols supported by sharing providers. These registrations are added to PIM setup. When participators click on the URL, the shell launches the PIM program with the following exemplary command line: %path%\PIM.exe /share %url%, where %url% is the actual URL in the share space which the user clicked, and %path% is the path to the PIM executable registered on the system.

The PIM looks up a sharing provider that supports the given URL scheme and instantiates that provider. The provider knows how to extract Sharing Relationship Context from the URL and/or its target, and how to establish a Sharing Relationship with this context.

The following example shows exemplary Sharepoint® Sharing Provider registry entries for URL configuration:

```
[HKEY_CLASSES_ROOT\stssync]
@="URL:Windows Sharepoint Services (WSS) Sharing Protocol"
"URL Protocol"=""
[HKEY_CLASSES_ROOT\stssync\DefaultIcon]
@="%OFFICE12%\\OUTLOOK.EXE,-9403"
[HKEY_CLASSES_ROOT\stssync\shell]
@="open"
[HKEY_CLASSES_ROOT\stssync\shell\open]
@=""
[HKEY_CLASSES_ROOT\stssync\shell\open\command]
@="\"%OFFICE12%\\OUTLOOK.EXE\" /share \"%1\""
```

Other provider sharing URL schemes are registered similarly, using the SAME open command syntax with the SAME PIM command-line switch (/share). PIM will differentiate between the protocols by examining the URL passed into the command line expanded from %1 above.

Sharing Providers may also register as a handler for certain file types (such as .ics, .vcs, or .rdf). Registration as a handler follows a similar pattern as above. The following are two exemplary methods:

Method #1:

Use a separate command-line for the PIM program (such as "/ical") for shell associations

```
[HKEY_CLASSES_ROOT\.ics]
"Content Type"="text/calendar"
@="icsfile"
[HKEY_CLASSES_ROOT\icsfile]
@="iCalendar File"
[HKEY_CLASSES_ROOT\icsfile\DefaultIcon]
@="%OFFICE12%\\1033\\OUTLLIBR.DLL,0"
[HKEY_CLASSES_ROOT\icsfile\shell]
[HKEY_CLASSES_ROOT\icsfile\shell\open]
[HKEY_CLASSES_ROOT\icsfile\shell\open\command]
@="\"%PIM.EXE\" /ical \"%1\""
```

This method uses a separate handler inside of the PIM program for the specific command-line parameter, and separate code to redirect to the sharing provider for handling the file type. This is very flexible, but slightly more costly in terms of support and maintenance.

Method #2:

Overlay a protocol (such as "webcal:") to redirect to the sharing engine

```
[HKEY_CLASSES_ROOT\.ics]
"Content Type"="text/calendar"
@="icsfile"
[HKEY_CLASSES_ROOT\icsfile]
@="iCalendar File"
[HKEY_CLASSES_ROOT\icsfile\DefaultIcon]
@="%OFFICE12%\\1033\\OUTLLIBR.DLL,0"
[HKEY_CLASSES_ROOT\icsfile\shell]
[HKEY_CLASSES_ROOT\icsfile\shell\open]
[HKEY_CLASSES_ROOT\icsfile\shell\open\command]
@="\"%OFFICE12%\\OUTLOOK.EXE\" /share webcal:\"%1\""
```

Method 2 does not use a special handler, since it uses the /share mechanism, which forwards appropriate protocols to the correct Sharing Provider. The provider may want to be aware of different semantics, however, between launched files from the shell and specific protocols launched from the web. A dummy protocol can be used to differentiate between these two usages. The provider would then register for both protocols and the Sharing Engine would simply forward handling to the provider. The following is a more detailed look at the Sharing Relationship Context (SHRECX)

```
typedef struct SharingRelationshipContext // ShReCx
{
    DWORD           dwStatus;
    GUID            guidInstance;
    GUID            guidProvider;
    PCWSTR          pwzProviderName;
    PCWSTR          pwzProviderUrl;
    PCWSTR          pwzRemoteName;
    PCWSTR          pwzRemotePath;
    PCWSTR          pwzRemoteUid;
    PCWSTR          pwzRemoteType;
    PCWSTR          pwzInitiatorName;
    PCWSTR          pwzInitiatorSmtp;
    SBinary*        pmbinInitiatorEid;
    PCWSTR          pwzParticipators;
    FILETIME        ftStart;
    FILETIME        ftStop;
    SRestriction    resFilter;
    DWORD           dwFlags;
    PCWSTR          pwzExtXml;
    PMBIN           pmbinExt;
    PCWSTR          pwzLocalPath;
    PCWSTR          pwzLocalName;
    PCWSTR          pwzLocalUid;
    PCWSTR          pwzLocalType;
} SHRECX, *PSHRECX;
```

Status (DWORD dwStatus)—States include the initial, tentative, and established states, in addition to expired and revoked. Provider-specific status can also be masked into the hiword of this value.

Share Uid (GUID guidShareUid)—This globally unique ID identifies this sharing relationship instance. Subsequent sharing messages or revocations should reference this unique ID for correlation purposes.

Provider Guid (GUID guidProvider)—This GUID identifies the type of provider that should be used to manage the synchronization and sharing relationship. The sharing engine uses this to instantiate the proper sharing provider.

Provider Name (PCWSTR pwzProviderName)—This unicode string reflects the name of the provider, adding context to situations where the provider cannot be found or installed.

For instance, this string could be used in an error message stating that this provider is not found on the system.

Provider Url (PCWSTR pwzProviderUrl)—This URL is intended to reference a provider's website. The website might have a link to install the provider, or other information for the user. If present, it provides more context than the provider name for error conditions (such as installation requirements).

Remote Name (PCWSTR pwzRemoteName)—This is the friendly name of the of remote data source. It might refer to file name, or simply display name. It may or may not be unique within the scope of the remote path.

Remote Path (PCWSTR pwzRemotePath)—This URL or path identifies where the data is stored remotely. The sharing provider uses this path to synchronize the data. This is the path component of a URL Remote Uid (PCWSTR pwzRemoteUid)—This Identifier is the unique ID of the remote data source. If the remote name is not unique, then this ID should be what is relied on for clarification. Entry ID or other GUID-like structure is recommended here.

Remote Type (PCWSTR pwzLocalType)—This is the content type of the remote data. In practice, this value is somewhat provider specific, but it is recommended that MIME content types are used where possible. For instance, for an iCal relationship, the value would be "text/calendar".

Initiator Name (PCWSTR pwzInitiatorName)—This is the friendly name of the person who originated the invitation or publication of the shared data. This name and corresponding SMTP address are included at the sender's discretion.

Initiator Smtp (PCWSTR pwzInitiatorSmtp)—The SMTP e-mail address of the person who originated the shared data. If there is any reason to allow the participator to contact the initiator, this would be desirable. In conjunction with Initiator Name, an erstwhile anonymous participator could provided feedback, suggest alternatives, or contribute to the shared data out of band.

Initiator Eid (SBinary* pmbinInitiatorEID)—The address book entry ID of the initiator, if they can be resolved in one of Outlook's address books. The Initiator friendly name and smtp address are still cached here, even if the EntryID can be found. This way, even if the Address Book entry ever becomes unreachable, the user has a fallback way of locating the initiator.

Participators (PCWSTR pwzParticipators)—This is the list of recipients who have been given a chance to share this data. Some providers will not be able to verify actual participation, and some sharing is anonymous. When present, this property is formatted the same as the TO field of the sharing message.

Start Date (FILETIME* pftStartDate)—This is the date on which the sharing of data should begin. Prior to this date, access permissions and shared data are not available. Providers can use this to restrict when the user may access the data. Not all providers support time-sensitive restrictions on sharing, in which case this value will be NULL. The PIM can also use this information to render, enable, or disable appropriate UI elements to accurately express the initiator's intent.

Stop Date (FILETIME* pftEndDate)—This is the date on which the sharing of data should end. After this date, access permissions and shared data will not be available. Providers can use this to restrict when the user may access the data. Not all providers support time-sensitive restrictions on sharing, in which case this value will be NULL. The PIM can also use this information to render, enable, or disable appropriate UI elements to accurately express the initiator's intent.

Filter (SRestriction resFilter)—This restriction filters the data that is shared in or out according to MAPI rules. It is not necessary to include start and end date in the filter, since they are handled separately. Not all providers support restricting or filtering data.

Flags (DWORD dwFlags)—This mask tells what permissions are granted to the Participator(s), the level of anonymity permitted to participators, and what level of reciprocation is allowed or required in this sharing relationship.

Binary Extensions (SBinary* pmbinext)—Any binary values that the provider might want to store here is valid. This is a slightly less structured way for extensions to be added to the sharing context.

Xml Extensions (PCWSTR pwzProvDataXML)—Any other provider-specific configuration setting which does not fit into the above properties may be XML-encoded in this property. This helps to ensure that extensions or $3^{rd}$ party providers can correctly configure themselves even if new requirements or parameters are invented.

For Example: The worldwide web provider might store an alternate publishing path to fallback to in case an http: connection cannot be established:

```
<WWW_Provider version="2.0">
    <alt_pub_path type="ftp" url="ftp.stillion.net/calendars"/>
</WWW_Provider>
```

Local Name (PCWSTR pwzLocalName)—This is the friendly name component of the of local data source path. It is typically the folder name of the local data copy. It does not need to be unique. This is implied by the context of the resource in many cases.

Local Path (PCWSTR pwzLocalPath)—This URL or path tells the provider where the data is stored locally. This is the path component, and does not include the actual name or ID. This is implied by the context of the resource in many cases.

Local Uid (PCWSTR pwzLocalUid)—This Identifier is the unique ID of the local data set. This may be an EntryID that points to the locally replicated resource.

Local Type (PCWSTR pwzLocalType)—This is the content type of the local data. In MAPI, content types are specified by Content Classes, or "folder types" such as "IPF.Appointment" or "IPF.Tasks". These are mapped from the remote type.

When an initiator wants to end the sharing relationship, the initiatior can send a revocation message with the shareID of the original relationship. The participator receives this message, and when it is opened, the PIM program finds the Sharing Relationship and mark it as REVOKED. The resource will no longer sync to the remote data source, and the user will be notified at some point (potentially delayed, i.e. when the user tries to access the local folder). The PIM program may also try to clean up the cached data.

The PIM also marks Sharing Relationships as EXPIRED when the end date has passed for sharing relationships which specify an end date. This does not occur immediately upon expiration, but whenever the resource is accessed and the PIM notes the expiration date.

Sharing Relationship Profiles

Exchange Initiator to Participator sharing

Sample valid values for the Sharing Relationship Context structure are:

| | |
|---|---|
| Share Uid | {F458EB88-2753-41AE-BFE9-9622C94F53E8} |
| Provider Guid | {AC898543-505F-499F-8DE9-21D15805447E} |
| Provider Name | Exchange Server |
| Provider URL | http://df-exfood/olk_provider_info.htm |
| Remote Path | STORE_ROOT\Calendar\projects\ |
| Remote Name | Ren & Stimpy |
| Remote Uid | {... entry ID of folder ... } |
| Remote Type | IPF.Appointment |
| Initiator Name | Initiator |
| Initiator SMTP | initiator@xxx.com |
| Initiator EID | {... entry ID of redmond\initiator ... } |
| Start Date | Dec. 27, 2004 |
| End Date | May 27, 2005 |
| Flags | READ_WRITE\|RECIPROCATION_REQUESTED |
| Filter | NULL |
| Extension | {... possibly x-forest info?. .. } |
| Local Path | NULL {... remote data not cached locally ... } |
| Local Name | NULL {... remote data not cached locally ... } |
| Local ID | {... remote data not cached locally ... } |
| Local Type | IPF.Appointment |
| Sync Settings | {... remote data not cached locally ... } |

Sharepoint Initiator to Participator sharing

Sample valid values for the Sharing Relationship Context structure are:

| Prop | Value |
|---|---|
| Share Uid | {F458EB88-2753-41AE-BFE9-9622C94F53E8} |
| Provider Guid | {6235425B-542C-4E1E-878D-B2FBA2D66047} |
| Provider Name | Windows Sharepoint Services |
| Provider Url | http://microsoft.com/sharepoint/outlook_info.htm |
| Remote Path | http://office/c92/Ren_Stimpy/list.aspx |
| Remote Name | Ren & Stimpy |
| Remote ID | {... list ID ... } |
| RemoteType | "calendar" |
| Initiator Name | Initiator |
| Initiator SMTP | initiator@xxx.com |
| Initiator EID | {... eid for Redmond\initiator ... } |
| Start Date | Dec. 27, 2004 |
| End Date | May 27, 2005 |
| Flags | READ_WRITE\|CANNOT_RECIPROCATE |
| Filter | NULL |
| Extension | NULL |
| Local Path | IPM_SUBTREE\Office\12.0 |
| Local Name | Outlook Team Site |
| Local ID | {... entryID of the local folder ... } |
| Local Type | IPF.Appointment |
| Sync Settings | {Once a Day} |

World-Wide Web "reach" Initiator to Participator sharing

Sample valid values for the Sharing Relationship Context structure are:

| Prop | Value |
|---|---|
| Share ID | {F458EB88-2753-41AE-BFE9-9622C94F53E8} |
| Provider Guid | {8D7E04D9-FBA1-489C-B432-32120B3B7D75} |
| Provider Name | World Wide Web |
| Provider URL | http://microsoft.com/Outlook/SharingWWW.htm |
| Remote Path | http://xxx.net/mywebspace/waycooljr |
| Remote Name | Ren & Stimpy |

-continued

| Prop | Value |
|---|---|
| Remote ID | {...list ID...} |
| Remote Type | text/calendar |
| Initiator Name | initiator |
| Initiator SMTP | initiator@xxx.com |
| Start Date | Dec. 27, 2004 |
| End Date | May 27, 2005 |
| Flags | READ_ONLY\|CANNOT_RECIPROCATE |
| Filter | {...no private items...} |
| ExtensionXml | NULL |
| Local Path | IPM_SUBTREE\Web Calendars |
| Local Name | Rush XXX Reunion Tour Calendar |
| Local ID | {...entryID of the local folder...} |
| Local Type | "IPF.Appointment" |
| Sync Settings | {Once a Day} |
| Share ID | {F458EB88-2753-41AE-BFE9-9622C94F53E8} |

This protocol is extendible to $3^{rd}$ parties who provide a plug-in which desires to support these interfaces. By doing so, a truly "pluggable" sharing system can exist, allowing vendors to customize the PIM and connect to their proprietary device or data source.

Sharing Infrastructure

Figure 2:
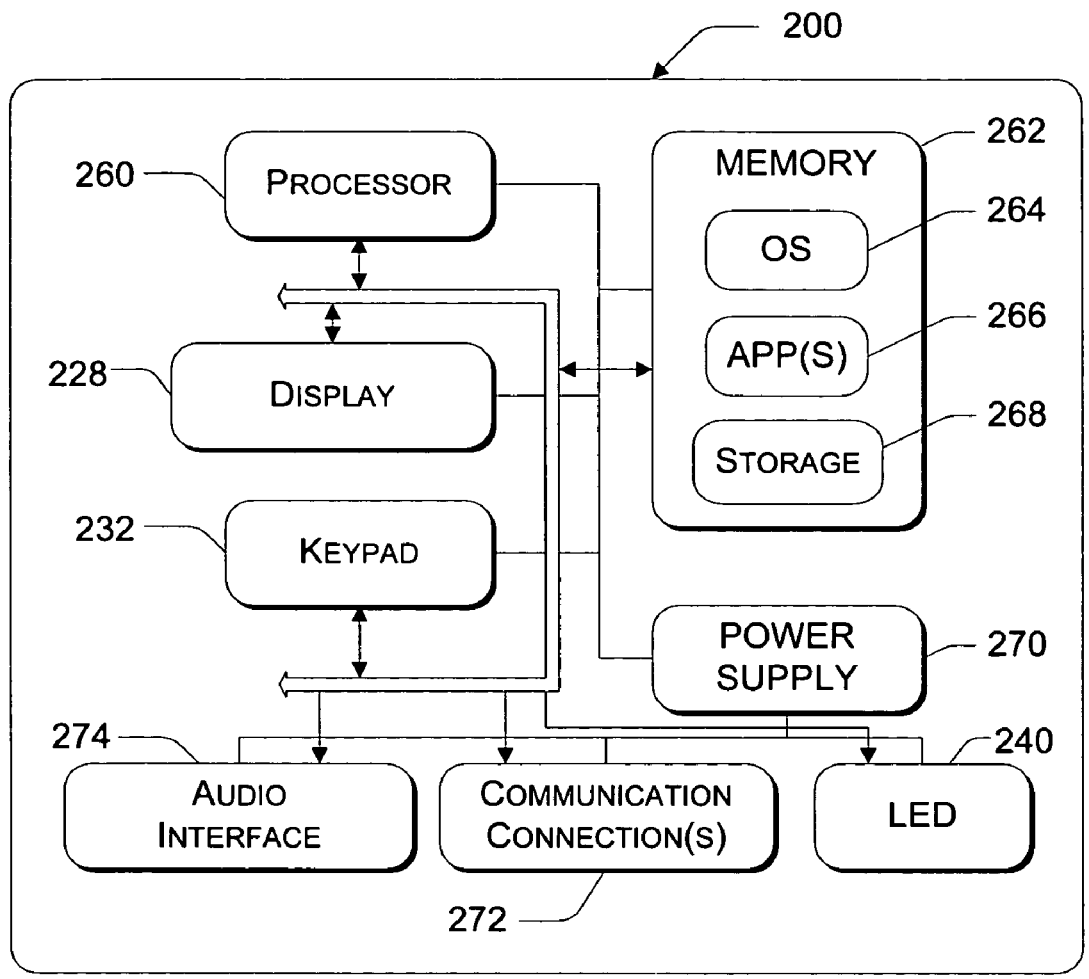
Figure 3:
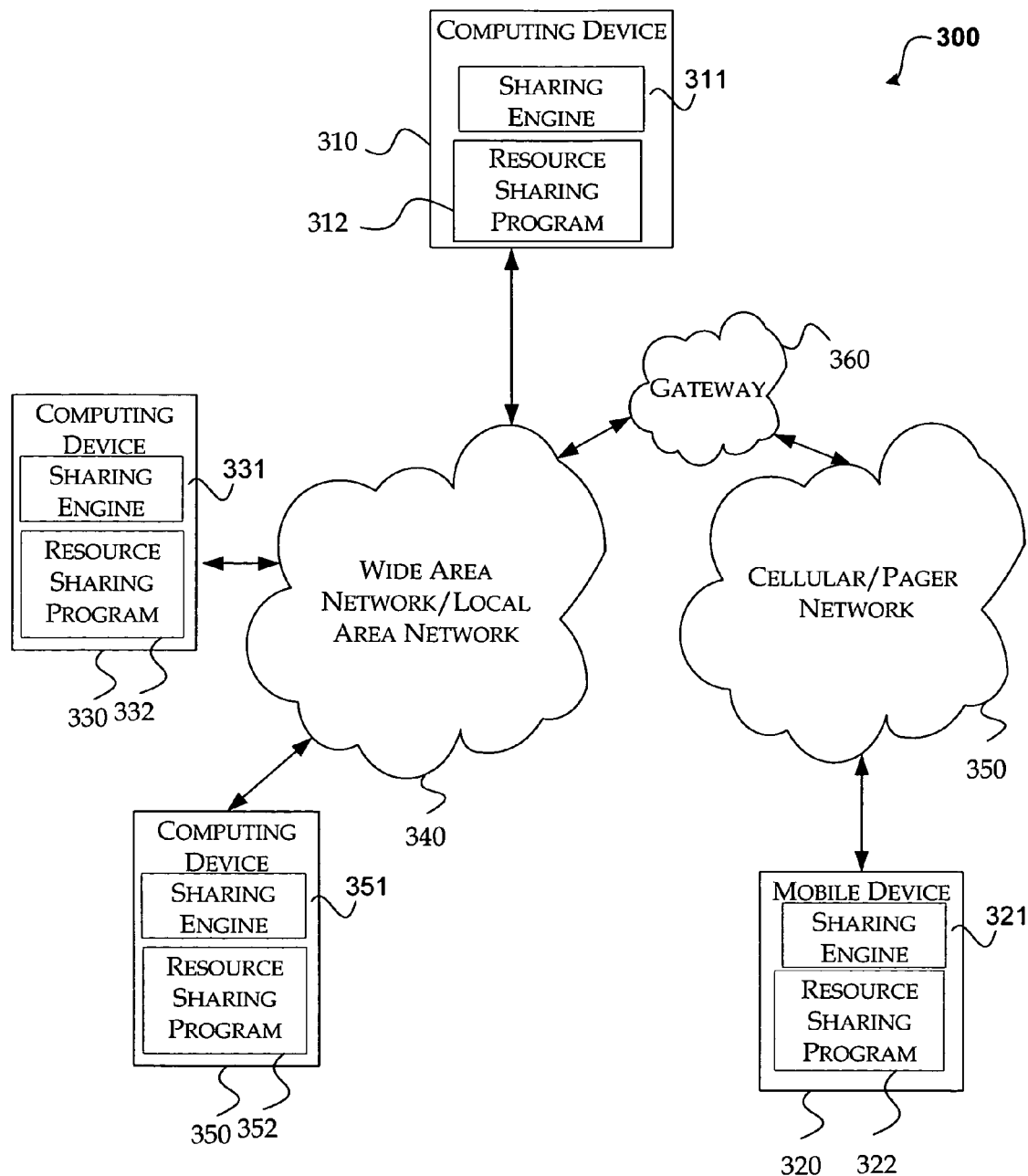
FIG. 3 is a functional block diagram generally illustrating a resource sharing system.

FIG. 3 is a functional block diagram generally illustrating a resource sharing system 300, in accordance with aspects of the invention. Computing device 310 and computing device 330 are computing devices such as the ones described in conjunction with FIG. 1 and mobile device 320 is a mobile computing device such as the one described above in conjunction with FIG. 2.

Sharing resource applications 312, 322 and 332 residing on the computing devices are configured to allow the sharing of resources that are established through an electronic message delivered over the network. The Applications may communicate using any one of several client-server protocols.

The shared resources may be transmitted over a wide area network (WAN)/local area network (LAN) 340. Cellular/pager network 350 is a network responsible for delivering messages to and receiving messages from wireless devices. The cellular/pager network 350 may include both wireless and wired components. For example, cellular/pager network may include a cellular tower that is linked to a wired telephone network. Typically, the cellular tower carries communication to and from cell phones, long-distance communication links, and the like.

Gateway 360 routes messages between cellular/pager network 350 and WAN/LAN 340. For example, a computer user may send a message that is addressed to a cellular phone. Gateway 360 provides a means for transporting the message from the WAN/LAN 340 to cellular/pager network 350. Conversely, a user with a device connected to a cellular network may be browsing the Web. Gateway 360 allows hyperlink text protocol (HTTP) messages to be transferred between WAN/LAN 340 and cellular/pager network 350.

The Sharing Engine (311, 321, 331, and 351) is designed to manage and direct various sharing providers, articulate information about sharing relationships, and to provide a framework for pluggable data sharing, data discovery, schema translation, and conflict resolution. This allows for common sharing operations to be implemented in a more centralized fashion, and eases the cost of implementing new providers. The sharing engine may be included within each computing device, or may be included on a server (not shown) that may be accessed by the other computing devices.

The Sharing Infrastructure is directed at providing a framework for these sharing tasks: Relationship Establishment via: URL protocol, Sharing Message, Data Discovery, Periodic Replication & Synchronization, Schema Translation, and Conflict Resolution.

The Sharing Engine

The Sharing Engine is a global resource that provides entry to all sharing mechanisms and relationships. It is the first point of contact that most features have with sharing.

The Sharing Engine is called upon to enumerate available or known providers for the purpose of showing the user what sharing options are available, or which providers can be used to share a specific item. Some providers are internal, and are known at compile time. Other providers can be plugged in via the object model if they support the correct interfaces.

The Sharing Engine is a singleton in the PIM codebase. It is constructed once when it is first accessed, it exists through the lifetime of the application session, and it is destructed when the PIM exits.

Sharing Providers

Figure 18:
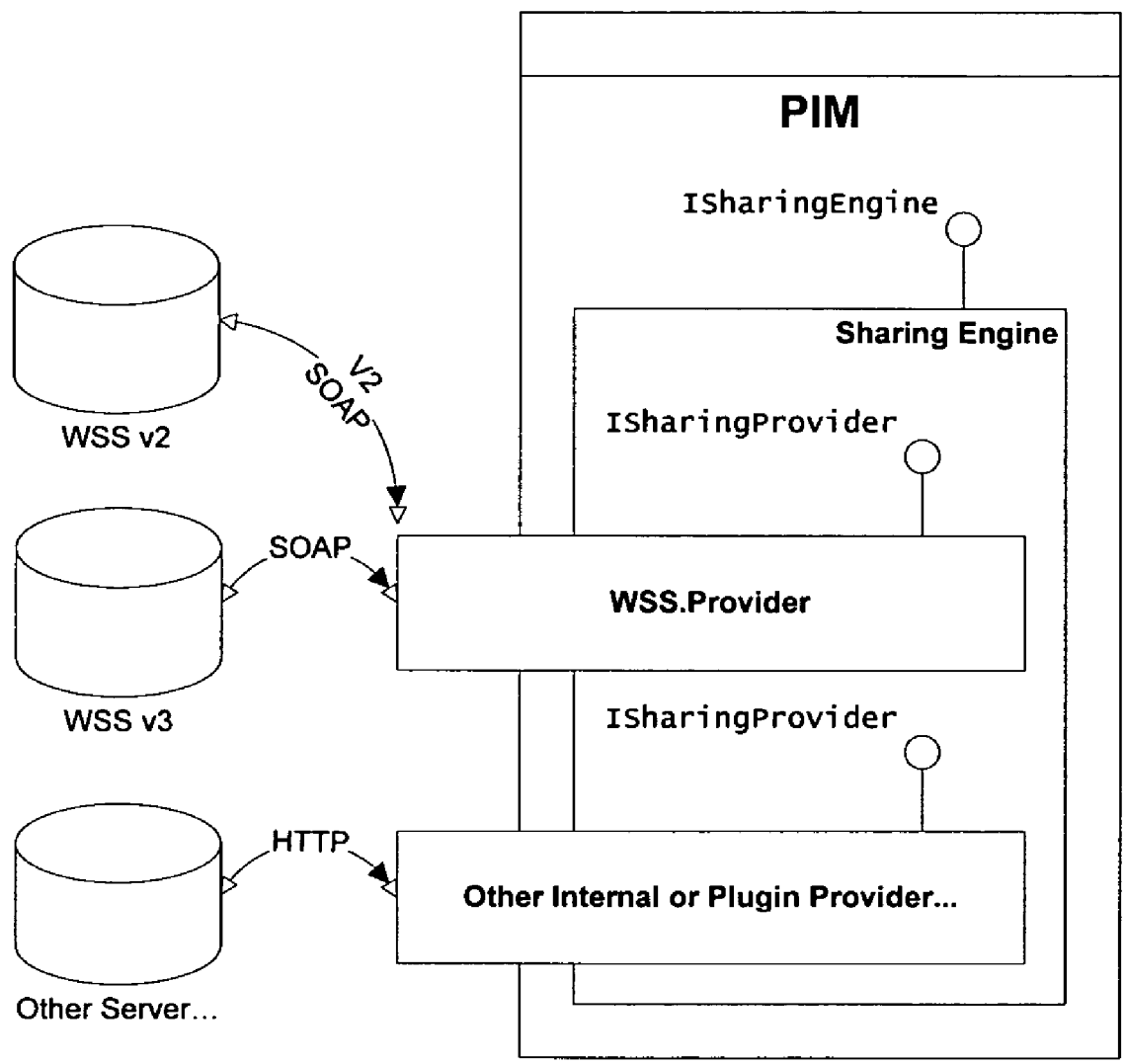
FIG. 18 illustrates an overview of a sharing provider.

FIG. 18 illustrates a sharing provider overview, in accordance with aspects of the invention. Sharing Providers plug into the Sharing framework in order to integrate with a PIM and its data stores. According to one embodiment, three interfaces are implemented by Sharing Providers. The ISharingProvider interface is used for sharing relationship establishment and configuration. The ISharingDiscovery interface is used for browsing remote sources or locations for sharing. The IOikConflictResolver interface is used for resolving conflicts brought about during synchronization. The ISchemaConverter is used for translation of schema to and from PIM/MAPI data types.

The ISharingDiscovery and IOlkConflictResolver interfaces are optional interfaces for sharing providers.

A base class sharing provider implements the interfaces required to accomplish the above objectives. Registered Sharing Providers are derivations of the base class. The Sharing Engine instantiates specific providers to accomplish its work. Internal, derived providers can rely on basic functionality while overriding virtual functions and extending where desirable.

Sharing Relationships

Figure 16:
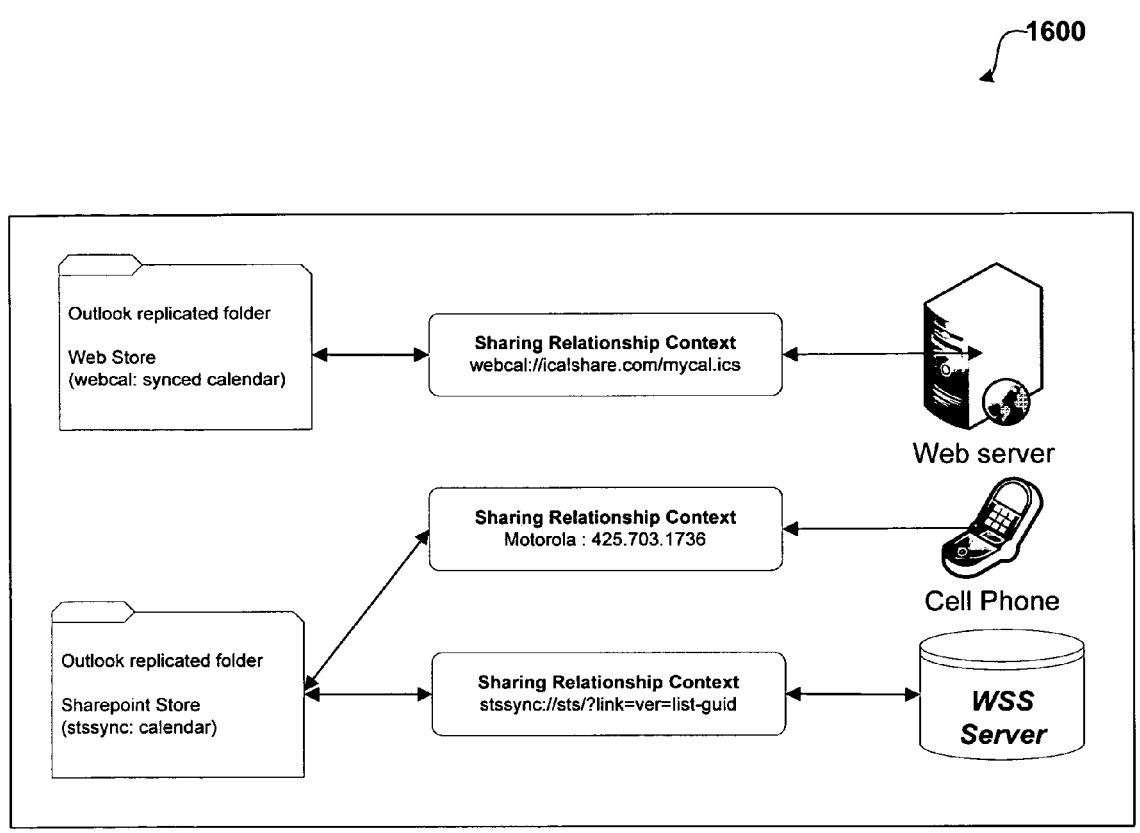
FIG. 16 illustrates sharing relationship context examples.

FIG. 16 illustrates sharing relationship context examples, in accordance with aspects of the invention.

Sharing Relationships are established to identify the context of a specific host data source, a local replica destination, a specific client user, and other attributes that the PIM uses for management purposes such as sync settings and the like. Conceptually, there is one sharing relationship for every remote resource that is being replicated into the PIM.

The ISharingRelationshipContext which is used for Sharing relationship info & management. This configuration data is encapsulated into a SharingRelationshipContext. The Sharing relationship context is used to serialize the configuration information in and out of a folder/message or a URL.

A base class implementation of the Sharing Relationship Context is provided which knows how to serialize standard relationship settings into and out of a sharing message. Nonstandard properties can also be serialized using a Binary property or an Xml extension. When a sharing relationship is established, the context is written to the local folder. Replication can be performed by the Sharing Engine and the Sharing Provider using this configuration information. Multiple relationships can be associated with a single folder.

Sharing Sync Objects

Figure 19:
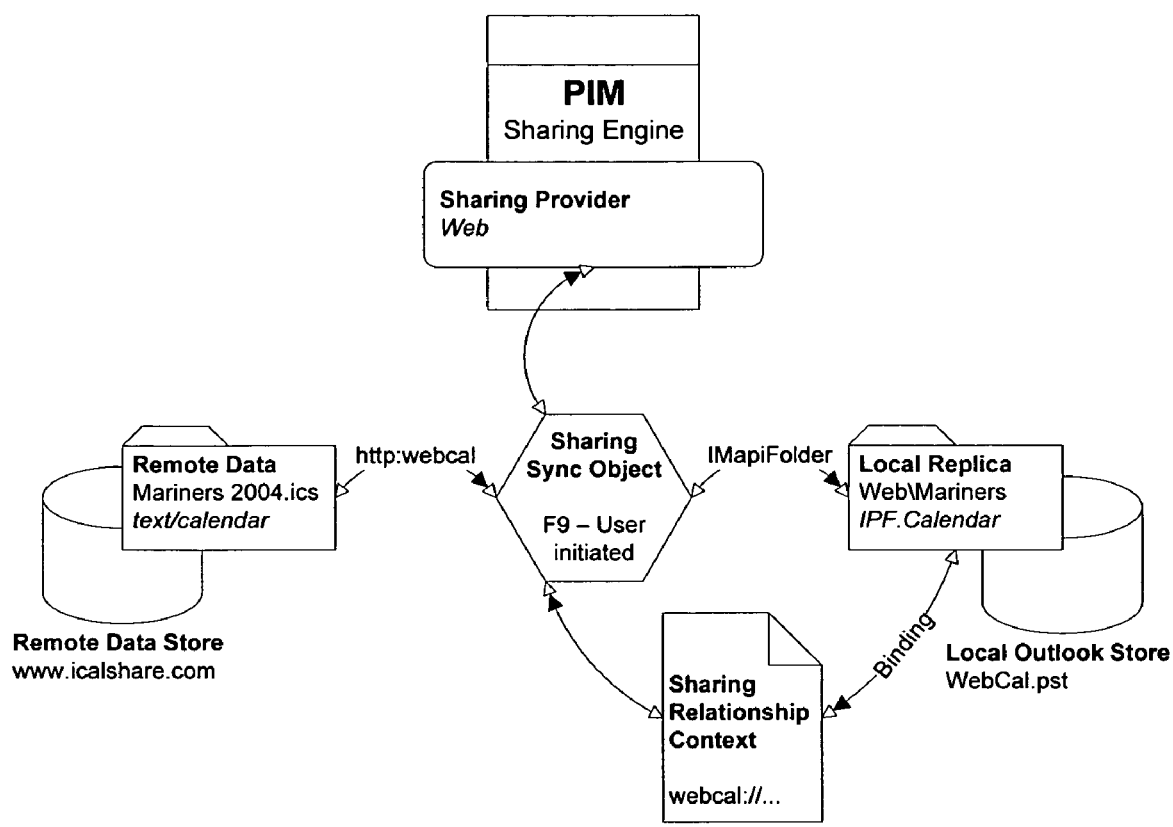
FIG. 19 illustrates sharing synchronization.

FIG. 19 illustrates a sharing synchronization diagram, in accordance with aspects of the invention. The following interfaces are implemented by Sharing Sync Objects: ISharingSync—Synchronization management and instigation; IOlkReplica—Synchronization with the PIM store; IOlkReplicaEnum—Pull-synchronization interface for replicator; IOlkConflictResolver—Resolving conflicts brought about during synchronization; and IProgressStatus—Progress status and cancellation interface.

When a Sharing Relationship is synchronized, a Sync Object is instantiated by the provider and triggered by the Sharing Engine. The Sync Object keeps a reference to the Sharing Relationship Context, the Provider, and the local replica during synchronization. The provider uses the context for information about the remote data source, connection information, and the last time it was synchronized.

The Sharing Relationship Context (shrecx)

The Sharing Relationship Context describes the association between the remote data source and the local replicated copy. This context, when serialized or stamped onto a folder or message is referred to as a "Binding". This information gives the provider a specific instance and context with which to do its work. A class which implements the sharing relationship context is provided. This class implements the ISharingRelationshipContext interface:

```
interface ISharingRelationshipContext
: IUnknown
{
    HRESULT ReadFromURL(DWORD dwFlags, PCWSTR pwzURL);
    HRESULT BindIntoURL(DWORD dwFlags, BSTR* pbstr);
    HRESULT ReadFromMsg(DWORD dwFlags, IDispatch* pMsg);
    HRESULT BindIntoMsg(DWORD dwFlags, IDispatch* pMsg);
    HRESULT set_Prop(DISPID dispid, PWSTR pwz);
    HRESULT get_Prop(DISPID dispid, PWSTR pwz, int* pcch);
    ...other specific get/set prop methods...
};
```

ReadFromUrl and BindIntoUrl are designed to serialize the configuration information into and out of a URL for a supported protocol. For example, a context for a Sharepoint relationship would be called to ReadFromUrl with an stssync: Url when launched from the browser. The provider would parse the various pieces of configuration from the URL and save them into the context. BindIntoUrl would perform the opposite translation, generating an stssync: URL from the set of context properties.

ReadFromMsg and BindToMsg are designed to serialize the configuration information into and out of a message—either a hidden message in the associated folder of a local replica, or a sharing message that is sent to distribute the configuration context. For example, when syncing to a webcal: folder, the configuration information is saved into the associated message of the folder that the calendar syncs into. Also, if the user shares this link with someone else, the configuration information would be bound into a sharing message for transport. On the receiving end, these methods would also be used to read the configuration from the sharing message and consequently bind to the second user's sync folder.

The get_/set_accessors are used to push data in and out of the context. For further details on each of these properties, see the Sharing Protocol design document.

Figure 20:
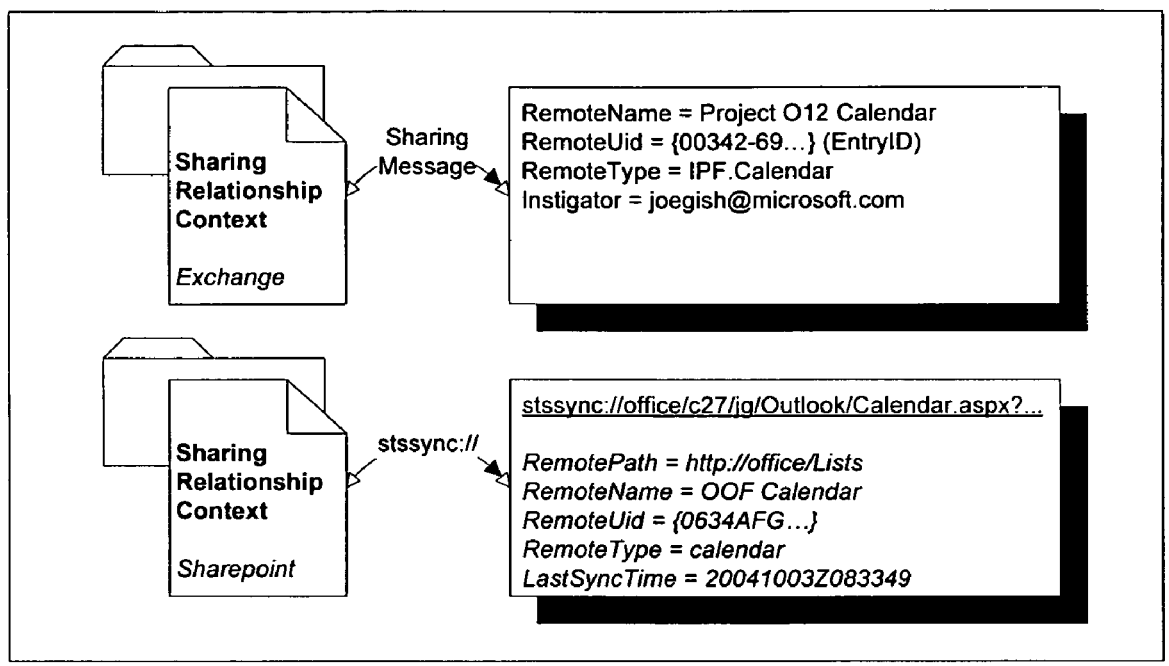
FIG. 20 shows sharing relationship context configuration.

FIG. 20 shows sharing relationship context configuration, in accordance with aspects of the present invention.

Sharing Providers may want to implement their own Sharing Relationship Context derivatives. It is primarily a way to distribute the context properties between bindings, providers, the sharing engine, and sync objects. The default context supports fairly general Url parsing (using a map) and general sharing property access.

A new sharing relationship context is created each time the user establishes a new sync relationship to a local folder in the PIM. The Context is written to the folder and remembered so that it can be referred to later. The Context itself is saved in the associated table on the Folder in an "IPM.Sharing.Binding.*" message. The act of creating a new message of this class and saving it to the folder is referred to as "Binding." Likewise, removing a message from this table is considered "Unbinding."

There are two flavors of bindings: incoming and outgoing. Incoming bindings describe relationships with remote data that is not owned by the client, but is replicated locally. It is someone else's data that they are sharing with you. Outgoing bindings describe relationships with recipients or remote locations for data that is owned locally by the client. This is your data that you are sharing with others. These two data types are distinguished by the message classes "IPM.Sharing.Binding.In" and "IPM.Sharing.Binding.Out" respectively.

Folders can have multiple sharing relationships established, and therefore multiple contexts written. One of these relationships is designated as the Primary relationship, and is always prioritized first for synchronization. Certain providers only support sync relationships when they act as the primary provider (Exchange). Other providers might only support relationships where they are the sole provider. These restrictions are communicated using the Provider's internal Capability Flags.

The Sharing Engine (in conjunction with the sharing providers) is responsible for ensuring that duplicate contexts are not constructed on a folder. Each context is assigned a unique GUID, which can be used to reference the original configuration. When the user tries to bind the same configuration, the Sharing Engine detects the duplicate. If the configuration is URL based, the provider compares the URL to detect the duplicate. Rather than binding a duplicate relationship, the existing relationship is updated with any potentially new information.

If certain providers have requirements that exclude them from participating in sharing relationships on the same folder, the first provider to establish a binding on that folder essentially "wins". Providers do not need to negotiate this on their own, the Sharing Engine will do so on their behalf.

Sharing Providers implement the interface ISharingProvider. This interface encapsulates most of the functionality that is specific to relationships with the particular provider including verification, establishment, revocation, recipient validation, etc.

```
interface ISharingProvider
: IUnknown
{
    HRESULT GetProviderInfo(SPIN* pspin);
    HRESULT GetContextFromMsg(IDispatch* pmsg,
        ISharingRelationshipContext** ppshrecx);
    HRESULT GetContextFromUrl(PCWSTR pwzUrl,
        ISharingRelationshipContext** ppshrecx);
    HRESULT EnumBindings(DWORD dwFlags, IMAPIProp*
    pmfoldScope,
        ISharingRelationshipContextEnum** ppv);
    HRESULT ValidateRecipients(DWORD dwFlags, PCWSTR
    pwzFromAddr,
        IDispatch* pmsg, ISharingRelationshipContext*
        pshrecx);
    HRESULT BindRelationship(DWORD dwFlags,
        ISharingRelationshipContext* pshrecx, IDispatch* pmsg);
    HRESULT UnbindRelationship(DWORD dwFlags,
        ISharingRelationshipContext* pshrecx, IDispatch* pmsg);
    HRESULT PrepareToSync(DWORD dwReason,
        ISharingRelationshipContext* pshrecx,
        ISharingSync** ppvObj);
    HRESULT GenerateDescription(DWORD dwFlags,
        ISharingRelationshipContext* pshrecx, BSTR* pbstr);
    HRESULT UserVerifyRelationship(DWORD dwFlags, HWND hwnd,
        ISharingRelationshipContext* pshrecx);
    HRESULT UserAdvancedConfiguration(DWORD dwFlags, HWND
    hwnd,
        ISharingRelationshipContext* pshrecx);
};
```

GetProviderInfo allows the caller to get information appropriate for rendering UI concerning the provider or any of its associated relationships. The SPIN struct is as follows:

```
typedef struct SharingProviderInfo  //spin
{
    DWORD    dwFlags;   // what parts of this structure are valid
    DWORD    dwCaps;    // provider capabilities
    PCWSTR   pwzName;   // localized name of provider
    PCWSTR   pwzUrl;    // Url for provider information
    HICON    hicon;     // suitable provider icon
} SPIN;
```

The SPIN members are descriptive of the provider in general, not of any sharing relationship in particular. The information in this structure is typically static, and does not need to be allocated or copied.

The EnumBindings method allow the caller to enumerate through bindings that are specific to this particular provider. Bindings can be limited in scope to the folders/subfolders of a given IMAPIProp, if provided. The enumerator returned should be able to iterate over all bound sharing relationships on a folder which pertain to this particular provider. This functionality is supported in the base Sharing Provider, so is not necessary to override unless the provider stores bindings in a proprietary way.

GetContext* can be called whenever a sharing relationship context is needed to interact with the given provider. For example: just before a URL is parsed for the provider, or just prior to processing a sharing message for the given provider. This override allows the provider to specialize an implementation of the Context, though it is typically not necessary. Providers may also wish to set provider-specific defaults for their context. They can call the base class implementation first, then customize the default context before returning it from this method.

The ValidateRecipients call allows dynamic validation while a sharing message is being processed. It is anticipated that some sharing providers might not be valid with certain types of recipients. For example, Exchange sharing might be unavailable when recipients cannot be resolved in the Global Address Book. For this purpose, recipients can be pre-parsed during this call and alternative sharing mechanisms can be negotiated, or errors can be reported to the user.

Relationships are established or revoked using the BindRelationship and UnbindRelationship methods respectively. Flags are passed to add context to the reason for establishing (binding) or revoking (unbinding) the sharing relationship. Binding essentially entails setting all the properties in the sharing relationship context onto the message. The message can be a Sharing Message (IPM.Sharing.Parcel*) which will be sent to another user (see: Sharing Protocol) or a binding on an associated message (IPM.Sharing.Binding.*) for a local folder.

The Sharing Protocol also supports a sharing message of class IPM.Sharing.Revoke which triggers the Unbind call. Unbind is called for associated messages on previously-bound relationships (IPM.Sharing.Binding.*). Unbinding entails either marking the sharing relationship as no longer active, or deleting the sharing relationship completely. An inactive sharing relationship no longer syncs, but still archives the fact that a relationship once existed, acting as a "tombstone" of sorts. Providers can either remove their bindings or mark them as revoked, as they see fit.

The PrepareToSync method provokes the provider to instantiate a sync object that can be used to synchronize the given relationship on a background thread. This call may be made on any thread, but subsequent calls to the object returned will occur on the background thread.

The GenerateDescription method allows generation of a string that details the sharing relationship. This string could be shown to allow validation of a potential relationship, or to describe an already-bound relationship. This string may be used in various parts of the user interface to describe the bound relationship. This method provides potentially much richer and more specialized support for string descriptions than simply using get_Prop from the context.

The UserVerify method allows custom processing when a relationship is about to be established. This also provides a mechanism for Trustworthy Computing's "Prominent Notice"—to ensure full disclosure of data sharing commitments to users.

UserAdvancedConfiguration allows custom UI when a provider supports properties beyond the standard sharing relationship context that should be available to the user. The Sharing Engine (sheng)

The singleton Sharing Engine object implements ISharingEngine, an interface that enumerates, indexes, and manages sharing providers and bindings.

```
interface ISharingEngine
:    IUnknown
{
     HRESULT EnumProviders(DWORD dwFlags,
ISharingProviderEnum** ppvEnum);
     HRESULT EnumBindings(DWORD dwFlags, REFCLSID guidProv,
         IMAPIProp* prop, ISharingRelationshipContextEnum**
         ppvEnum);
     HRESULT BuildContextFromURL(PCWSTR pwzURL,
         ISharingRelationshipContext** ppShReCx);
     HRESULT BuildContextFromMsg(IMAPIProp* pprop,
         ISharingRelationshipContext** ppShReCx);
     HRESULT LookupProvider(PCWSTR pwzURL, GUID* pguidOut);
     HRESULT InstantiateProvider(REFCLSID guid,
         ISharingProvider** ppvOut);
};
```

The Enum* methods provide a UI or other high-level code a way to easily iterate through the existing providers, or existing bindings. Bindings can be limited in scope to the folders/subfolders of a given IMAPIProp, if provided.

The BuildContext* methods provide direct access to instantiation of a context from the two forms of single serialization: Message and Url.

The Lookup method is a shortcut for enumerating through all providers and looking for the one that supports the given protocol.

The InstantiateProvider method is a direct way to gain access to a specific sharing provider.

The Sharing Engine object (g_sheng) is a singleton within the PIM process space. A global accessor method (HrGetSharingEngine()) provides the caller a referenced interface pointer to this object, unless the PIM is in the process of shutting down and the global singleton has already been destroyed. This object is safe to call from any thread, but is most often called from the main thread in response to user initiated tasks.

The Sharing Engine allocates Context and Provider objects as needed. Sharing Provider objects should be fairly light-weight since most of the data necessary to perform its operation is stored in the context. A context is passed to a provider whenever it is necessary for the operation. The Provider object is not guaranteed to be called from the same thread that it is allocated on. When a Provider is syncing, it may allocate buffers and other indices in memory.

Illustrative Operating Environment

Figure 1:
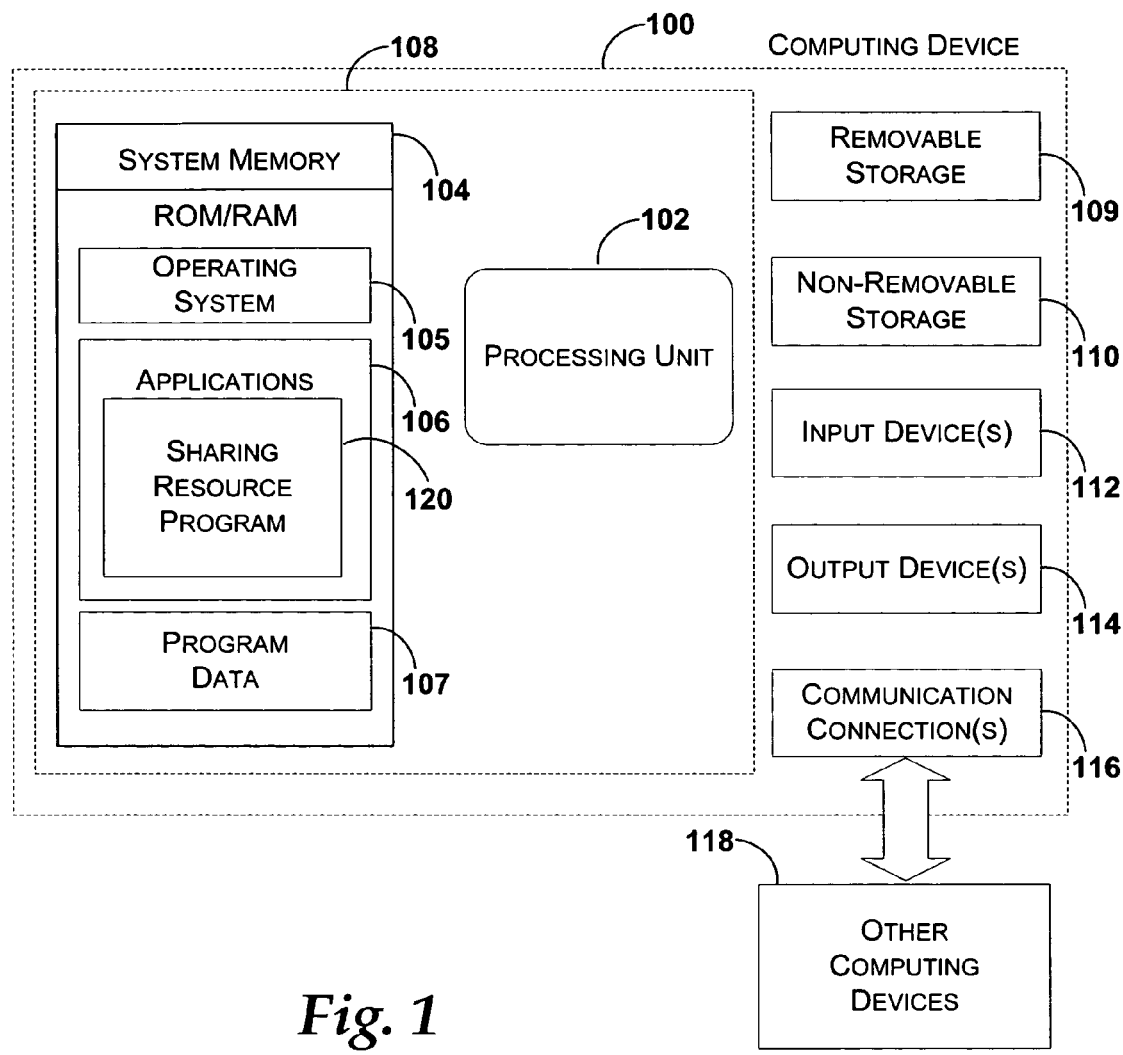
FIGS. 1 and 2 illustrate an exemplary computing devices that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a sharing resource program 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on the operating system 264. A sharing resource application resides on mobile computing device 200 and is programmed to perform instructions relating to sharing resources. The sharing resources application may reside in the hardware or software of the device. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection(s), such as a wireless interface layer, that performs the function of transmitting and receiving communications. Communications connection 272 facilitates wireless connectivity between the mobile computing device 200 and the outside world. According to one embodiment, transmissions to and from communications connection 272 are conducted under control of the operating system 264.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for establishing sharing of a resource, comprising:
    receiving, from an initiator, a first indication of a first resource to share, wherein the first resource is at least one of:
        a calendar;
        a contacts list; and
        a tasks list;
        and the first resource is subject to permissions that cause the first resource to be accessible to the initiator and inaccessible to a participant;
    receiving, from the initiator, a second indication to share the first resource with the participant;
    generating a sharing message by selecting the participant and the first resource to share from within a draft of an email, prior to the sharing message being sent to the participant,
    wherein the sharing message includes sharing properties for accessing the first resource and a reciprocal sharing request requesting access for the initiator to an existing second resource of the participant, wherein the reciprocal sharing request includes a selectable option within the sharing message that allows the participant to accept or decline the reciprocal sharing request;
    sending the email including the sharing message to the participant from the initiator; and
    receiving, from the initiator, changes to the permissions such that the first resource is accessible to the participant, wherein the changed permissions grant the participant ongoing access to the first resource such that updates made by the initiator to the first resource are automatically available to the participant.

2. The method of claim 1, further comprising receiving by the initiator a response message after the participant has selected the option, wherein the response message indicates whether the reciprocal sharing request has been accepted.

3. The method of claim 1, further comprising allowing the initiator to adjust a sharing configuration associated with the first resource.

4. The method of claim 1, further comprising automatically adding the first resource to a Personal Information Manager program associated with the participant.

5. The method of claim 3, further comprising including a personal message within the sharing message.

6. A computer storage medium having computer-executable instructions for establishing sharing of a resource, the instructions comprising:
    receiving, from an initiator, a first indication of a first resource to share, wherein the first resource is at least one of:
        a calendar;
        a contacts list; and
        a tasks list
        and the first resource is subject to first permissions that cause the first resource to be accessible to the initiator and inaccessible to a participant;
    receiving, from the initiator, a second indication to share the first resource with the participant;

generating a sharing message by selecting the participant and the first resource to share from within a draft of an email, prior to the sharing message being sent to the participant, wherein the sharing message includes first sharing properties for accessing the first resource and a reciprocal sharing request requesting access for the initiator to an existing second resource of the participant, wherein the second resource is subject to second permissions that cause the second resource to be accessible to the participant and inaccessible to the initiator;

sending the email including the sharing message to the participant from the initiator;

receiving, from the initiator, changes to the first permissions such that the first resource is accessible to the participant, wherein the changed first permissions grant the participant ongoing access to the first resource such that updates made by the initiator to the first resource are automatically available to the participant;

receiving a response message from the participant that the reciprocal sharing request has been accepted by the participant, wherein the response message includes second sharing properties for accessing the second resource; and storing at least the first sharing properties with the first resource.

7. The computer storage medium of claim 6, wherein generating the sharing message comprises including the reciprocal sharing request when selected by the initiator.

8. The computer storage medium of claim 6, further comprising allowing the initiator to adjust a sharing configuration associated with the first resource.

9. The computer storage medium of claim 6, further comprising automatically adding the first resource to an email program associated with the participant.

10. The computer storage medium of claim 8, further comprising including a personal message within the electronic message.

11. A system for establishing sharing of a resource, comprising:

a first computing device coupled to a network, including:
a processor and a computer-readable medium;
an operating environment stored on the computer-readable medium and executing on the processor;
a display; and
an application operating under the control of the operating environment and operative to perform actions, including:
receiving, from an initiator, a first indication of a first resource to share, wherein the first resource is at least one of:
a calendar;
a contacts list; and
a tasks list;
and the first resource is subject to first permissions that cause the resource to be accessible to the initiator and inaccessible to a participant;

receiving, from the initiator, a second indication to share the first resource with the participant;

generating a sharing message by selecting the participant and the first resource to share from within a draft of an email, prior to the sharing message being sent to the participant, wherein the sharing message includes sharing properties for accessing the first resource and a reciprocal sharing request requesting access for the initiator to an existing second resource of the participant, wherein the reciprocal sharing request includes a selectable option within the sharing message that allows the participant to accept or decline the reciprocal sharing request, and wherein the second resource is subject to second permissions that cause the second resource to be accessible to the participant and inaccessible to the initiator;

sending the email including the sharing message to the participant from the initiator;

receiving, from the initiator, changes to the first permissions such that the first resource is accessible to the participant, wherein the changed first permissions grant the participant ongoing access to the first resource such that updates made by the initiator to the first resource are automatically available to the participant; and storing at least the first sharing properties with the first resource; and a second computing device coupled to the network, including:

a second processor and a second computer-readable medium;

a second operating environment stored on the second computer-readable medium and executing on the second processor;

a second display; and a second application operating under the control of the second operating environment and operative to perform actions, including:
receiving the email;
displaying the email to the participant;
determining whether the participant has accepted the reciprocal sharing request and when the participant has accepted the reciprocal sharing request sending a response message to the first computing device, wherein the response message includes second sharing properties for accessing the second resource; and
storing at least the second sharing properties with the second resource.

12. The system of claim 11, wherein the application on the first computing device is further configured to adjust a sharing configuration associated with the first resource.

13. The system of claim 11, wherein the application on the first computing device is further configured to include a personal message within the email.

* * * * *